United States Patent
Hashimoto et al.

(10) Patent No.: US 9,859,775 B2
(45) Date of Patent: Jan. 2, 2018

(54) METHOD FOR FORMING A CONCENTRIC WINDING COIL

(71) Applicant: AISIN AW CO., LTD., Anjo-shi, Aichi-ken (JP)

(72) Inventors: Shingo Hashimoto, Okazaki (JP); Masaki Saito, Okazaki (JP); Tokuhisa Mishina, Okazaki (JP); Shinya Shimizu, Okazaki (JP)

(73) Assignee: AISIN AW CO., LTD., Anjo (JP)

( * ) Notice: Subject to any disclaimer, the term of this patent is extended or adjusted under 35 U.S.C. 154(b) by 189 days.

(21) Appl. No.: 14/765,280

(22) PCT Filed: Mar. 25, 2014

(86) PCT No.: PCT/JP2014/058316
§ 371 (c)(1),
(2) Date: Jul. 31, 2015

(87) PCT Pub. No.: WO2014/157218
PCT Pub. Date: Oct. 2, 2014

(65) Prior Publication Data
US 2015/0372573 A1    Dec. 24, 2015

(30) Foreign Application Priority Data

Mar. 29, 2013 (JP) .................................. 2013-074557
Sep. 10, 2013 (JP) .................................. 2013-187743

(51) Int. Cl.
*H02K 15/00* (2006.01)
*H02K 15/04* (2006.01)
(Continued)

(52) U.S. Cl.
CPC ............. *H02K 15/045* (2013.01); *H02K 3/12* (2013.01); *H02K 15/066* (2013.01);
(Continued)

(58) Field of Classification Search
CPC ......... Y10T 29/49011; Y10T 29/49009; Y10T 29/49012; Y10T 29/49071; H02K 15/045; H02K 3/12; H02K 3/28
(Continued)

(56) References Cited

U.S. PATENT DOCUMENTS 8,427,024 B2 *   4/2013   Watanabe ................ H02K 3/12
                                                310/179
8,884,489 B2 *   11/2014   Yamada ................... H02K 3/12
                                                310/179
(Continued)

FOREIGN PATENT DOCUMENTS

JP    2005-051981 A    2/2005
JP    2008-104293 A    5/2008
(Continued)

*Primary Examiner* — Thiem Phan
(74) *Attorney, Agent, or Firm* — Oliff PLC

(57) ABSTRACT

A method for forming a concentric winding coil in which a coil end portion protruding from an axial end face of a stator core has a plurality of different nonlinear shapes, from a rectangular conductor wound in a predetermined number of turns, the method including forming the coil end portion into the plurality of different nonlinear shapes in one step by causing a die to make a stroke movement in a predetermined direction with respect to the rectangular conductor being set.

4 Claims, 11 Drawing Sheets

(51) Int. Cl.
*H02K 15/06* (2006.01)
*H02K 3/12* (2006.01)

(52) U.S. Cl.
CPC .... *Y10T 29/49009* (2015.01); *Y10T 29/49011* (2015.01); *Y10T 29/49012* (2015.01)

(58) Field of Classification Search
USPC .................................. 29/596, 597, 598, 605
See application file for complete search history.

(56) References Cited

U.S. PATENT DOCUMENTS

| | | |
|---|---|---|
| 2008/0093948 A1 | 4/2008 | Naganawa |
| 2012/0181891 A1 | 7/2012 | Yamada et al. |
| 2014/0021823 A1 | 1/2014 | Kitamura et al. |

FOREIGN PATENT DOCUMENTS

| | | |
|---|---|---|
| JP | 2012-125043 A | 6/2012 |
| JP | 2012-239371 A | 12/2012 |
| WO | 2011/155083 A1 | 12/2011 |
| WO | 2012/137306 A1 | 10/2012 |

\* cited by examiner

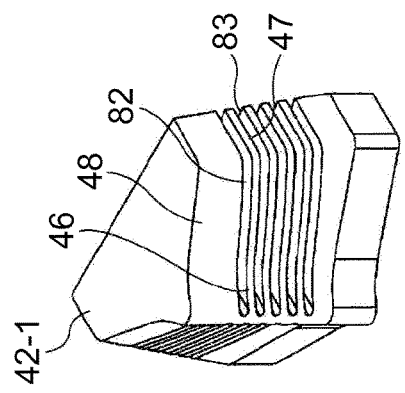
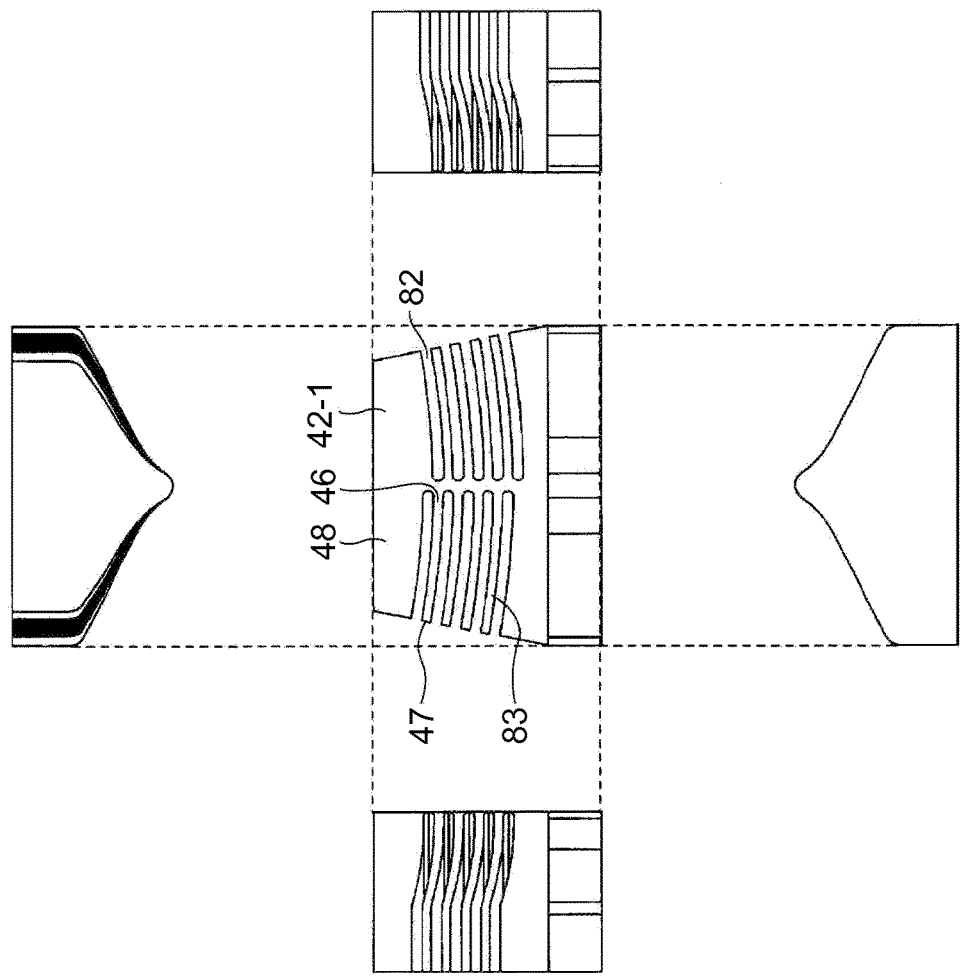

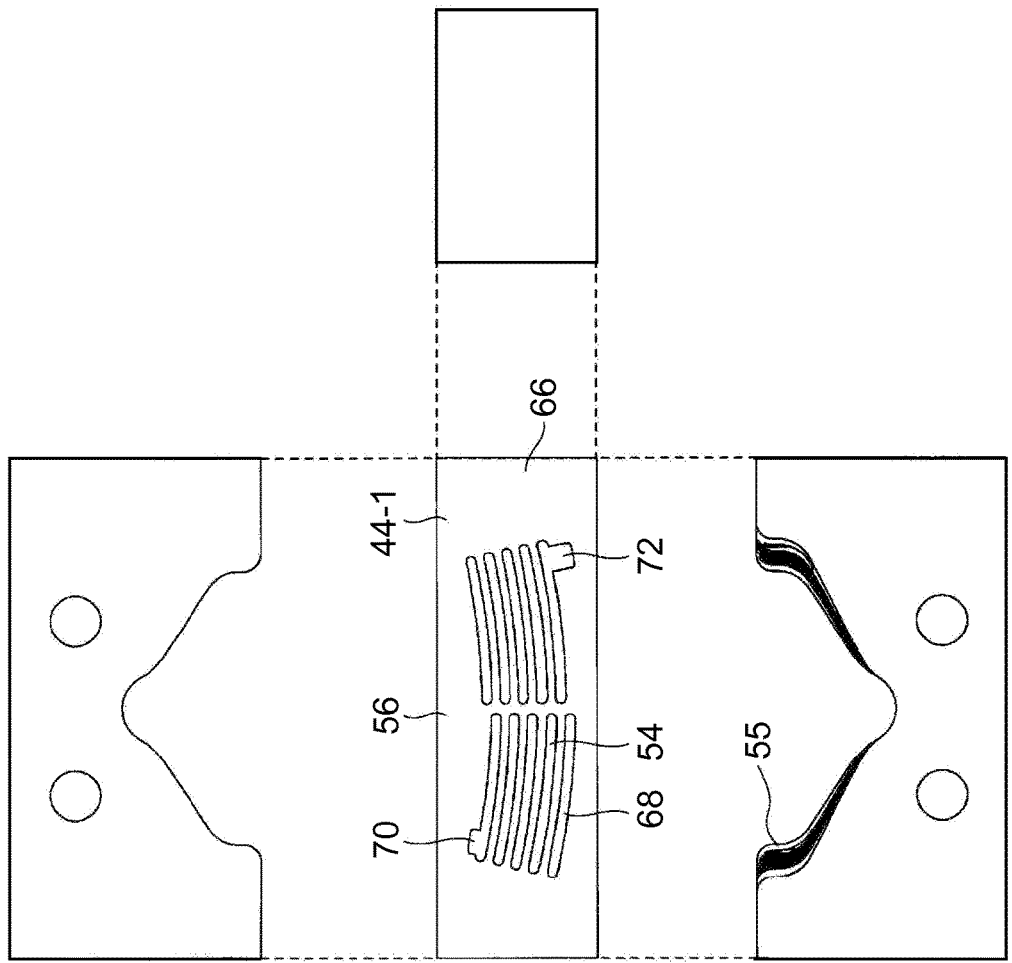

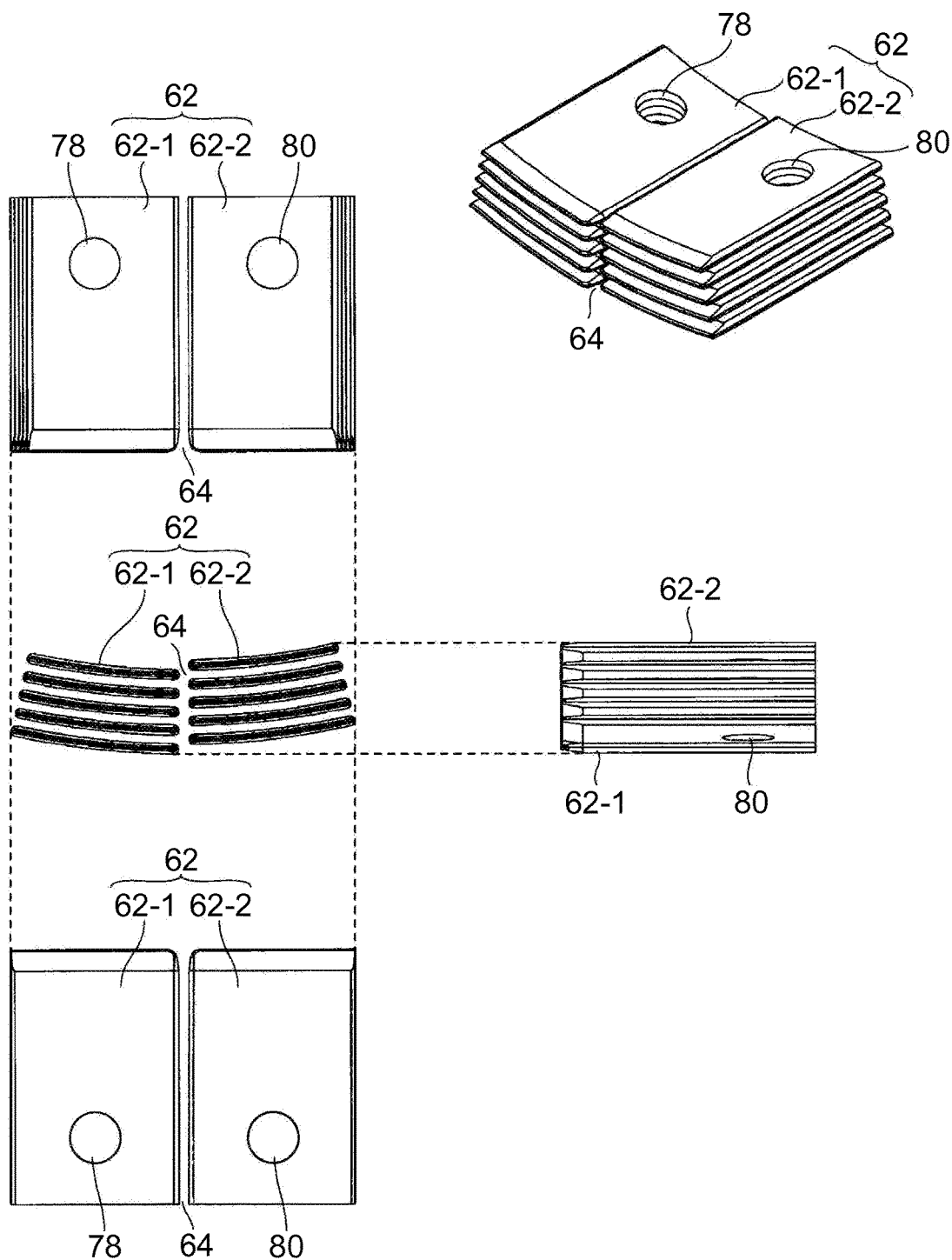

METHOD FOR FORMING A CONCENTRIC WINDING COIL

BACKGROUND

The present disclosure relates to methods and apparatuses for forming a concentric winding coil, and more particularly to methods and apparatuses for forming a concentric winding coil in which a coil end portion protruding from an axial end face of a stator core has a plurality of different nonlinear shapes, from a rectangular conductor wound in a predetermined plurality of turns.

Conventionally, methods and apparatuses for forming a stator coil in which a coil end portion protruding from an axial end face of a stator core has a plurality of different nonlinear shapes are known in the art (see, e.g., JP 2012-239371 A). In the forming apparatus of Patent Document 1 includes a holding mechanism that holds therein a rectangular conductor having a quadrilateral section, a die that bends the rectangular conductor of a predetermined length held in the holding mechanism so that the rectangular conductor can be used as a stator coil, and a moving mechanism that causes the die to make a stroke movement toward the holding mechanism. In such a forming apparatus, when the moving mechanism causes the die to make a stroke movement toward the holding mechanism, the rectangular conductor of the predetermined length held in the holding mechanism is bent so that a corresponding portion corresponding to the coil end portion of the stator coil is formed into a crank shape, an arc shape, and a bent shape. A single-layer stator coil in which crank formation, arc formation, and edgewise formation have been performed on the coil end portion is formed by such a bending process.

SUMMARY

In the technique described in JP 2012-239371 A, however, a single-layer stator coil is formed from a rectangular conductor. It is therefore difficult to apply this technique to form a concentric winding coil from a rectangular conductor wounded in a plurality of turns. Even if this technique is applied to form such a concentric winding coil, considerable time and energy is required to form a concentric winding coil, and formation accuracy may be reduced.

The present disclosure was developed in view of the above circumstances, and the present disclosure provides a method and an apparatus for forming a concentric winding coil, which can easily and accurately form in a short time a concentric winding coil in which a coil end portion has a plurality of different nonlinear shapes.

According to one exemplary aspect of the present disclosure, a method for forming a concentric winding coil in which a coil end portion protruding from an axial end face of a stator core has a plurality of different nonlinear shapes, from a rectangular conductor wound in a predetermined number of turns, the method including: forming the coil end portion into the plurality of different nonlinear shapes in one step by causing a die to make a stroke movement in a predetermined direction with respect to the rectangular conductor being set; bending a corresponding portion of the rectangular conductor which corresponds to the coil end portion in a stacking direction in which windings of the rectangular conductor to be set are stacked, by inserting the corresponding portion into a predetermined clearance by using a fin-shaped die having a plurality of fins that are arranged next to each other in the stacking direction with the predetermined clearance therebetween, and bending the corresponding portion in a perpendicular direction perpendicular to the stacking direction of the rectangular conductor to be set, by using an outer shape forming die formed integrally with the fin-shaped die and having a processing surface facing in the perpendicular direction; and causing the bending of the corresponding portion of the rectangular conductor to proceed from a middle part of the corresponding portion toward both outer ends thereof.

According to another exemplary aspect of the present disclosure, an apparatus for forming a concentric winding coil in which a coil end portion protruding from an axial end face of a stator core has a plurality of different nonlinear shapes, from a rectangular conductor wound in a predetermined number of turns, the apparatus including: a fin-shaped die that has a plurality of fins arranged next to each other with a predetermined clearance therebetween in a stacking direction in which windings of the rectangular conductor to be set are stacked, and that bends a corresponding portion of the rectangular conductor which corresponds to the coil end portion in the stacking direction by inserting the corresponding portion into the clearance; an outer shape forming die that is formed integrally with the fin-shaped die, that has a processing surface facing in a perpendicular direction perpendicular to the stacking direction of the rectangular conductor to be set, and that bends the corresponding portion of the rectangular conductor in the perpendicular direction; and a moving mechanism that causes the fin-shaped die and the outer shape forming die to make a stroke movement in a predetermined direction with respect to the rectangular conductor being set, wherein the bending of the corresponding portion of the rectangular conductor is caused to proceed from a middle part of the corresponding portion toward both outer ends thereof.

According to the present disclosure, a concentric winding coil in which a coil end portion has a plurality of different nonlinear shapes can be easily and accurately formed in a short time.

BRIEF DESCRIPTION OF THE DRAWINGS

FIG. 7 shows configuration diagrams of a protruding die of an outer shape forming die included in the apparatus for forming a concentric winding coil according to the embodiment.

FIG. 8 shows configuration diagrams of a recessed die of the outer shape forming die included in the apparatus for forming a concentric winding coil according to the embodiment.

FIG. 9 shows configuration diagrams of a fin-shaped die included in the apparatus for forming a concentric winding coil according to the embodiment.

DETAILED DESCRIPTION OF THE EMBODIMENTS

A specific embodiment of a method and an apparatus for forming a concentric winding coil according to the present disclosure will be described below with reference to the accompanying drawings.

Figure 1A:
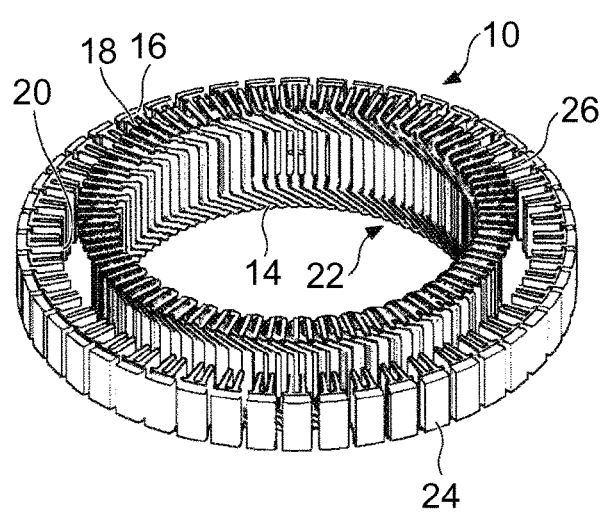
FIG. 1 shows configuration diagrams of a stator on which a coil assembly comprised of concentric winding coils as an embodiment of the present disclosure is mounted.
Figure 1B:
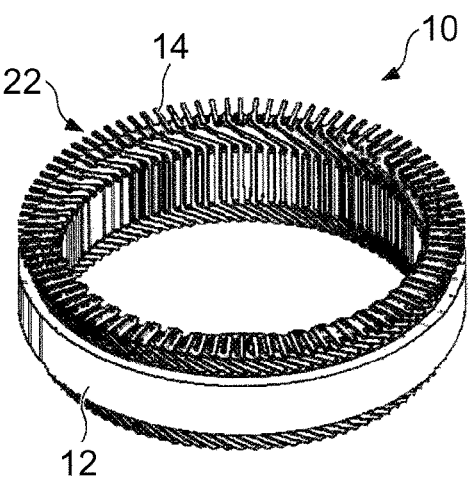
Figure 2A:
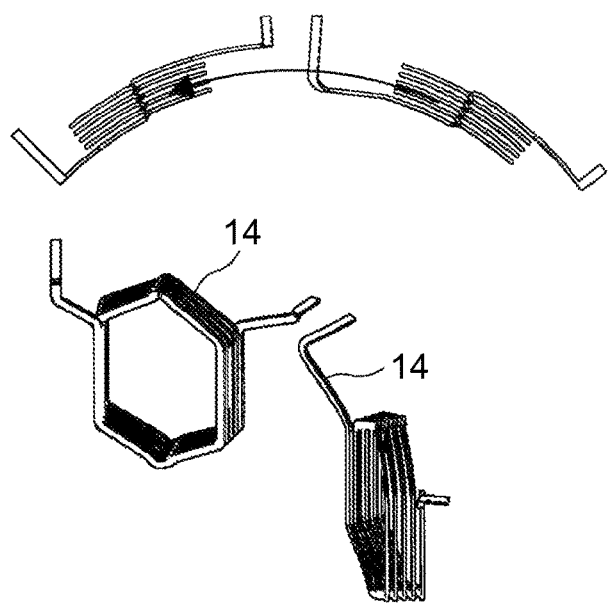
FIG. 2 shows diagrams illustrating a method for forming the coil assembly by using a plurality of concentric winding coils of the embodiment.
Figure 2B:
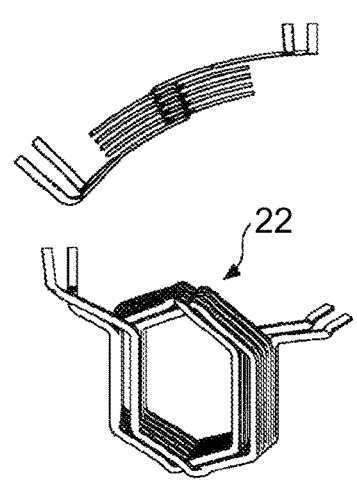
Figure 3A:
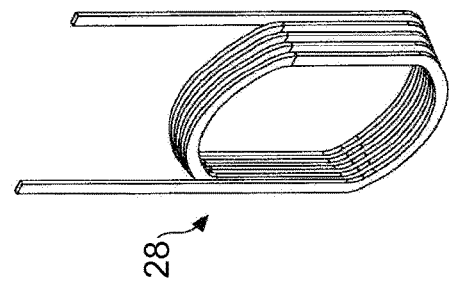
FIG. 3 shows configuration diagrams before completion of formation of the concentric winding coil of the embodiment.
Figure 3C:
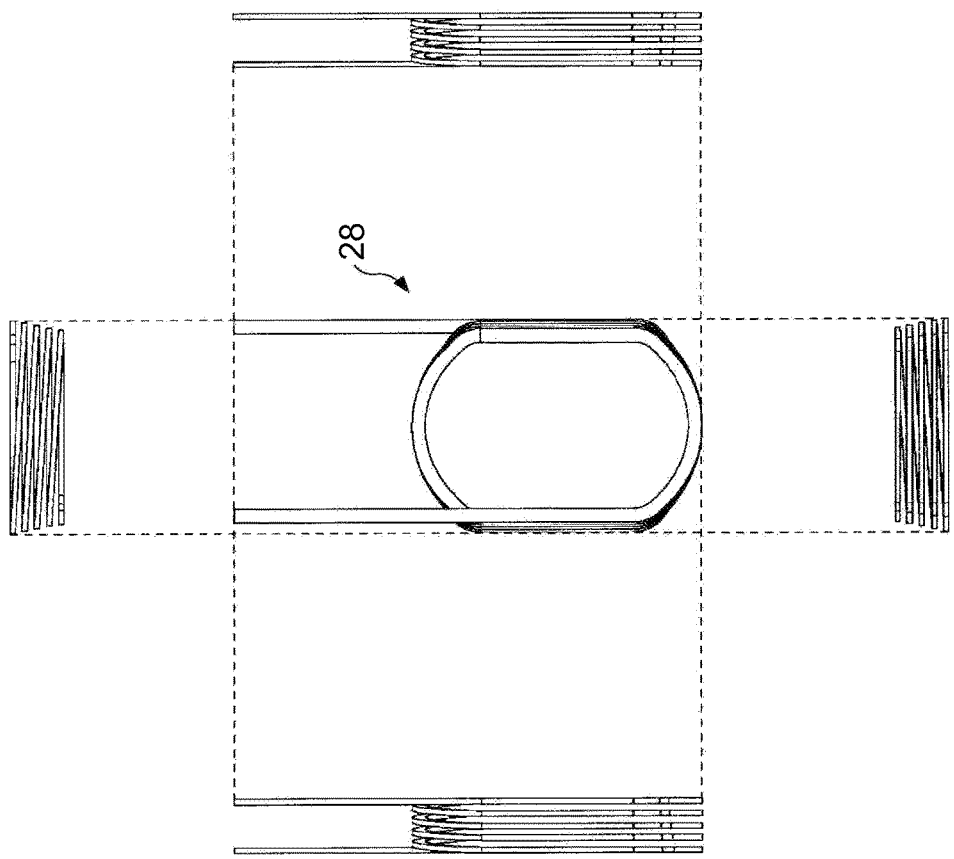
Figure 3B:
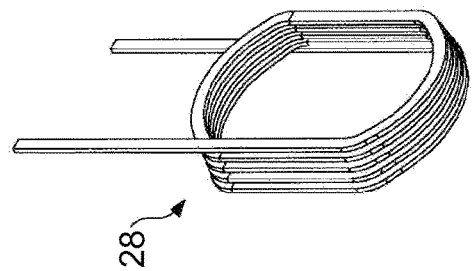
Figure 4A:
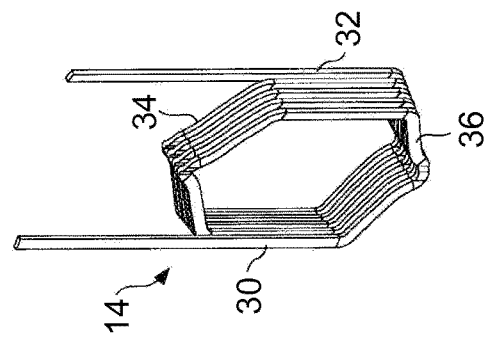
FIG. 4 shows configuration diagrams after completion of formation of the concentric winding coil of the embodiment.
Figure 4C:
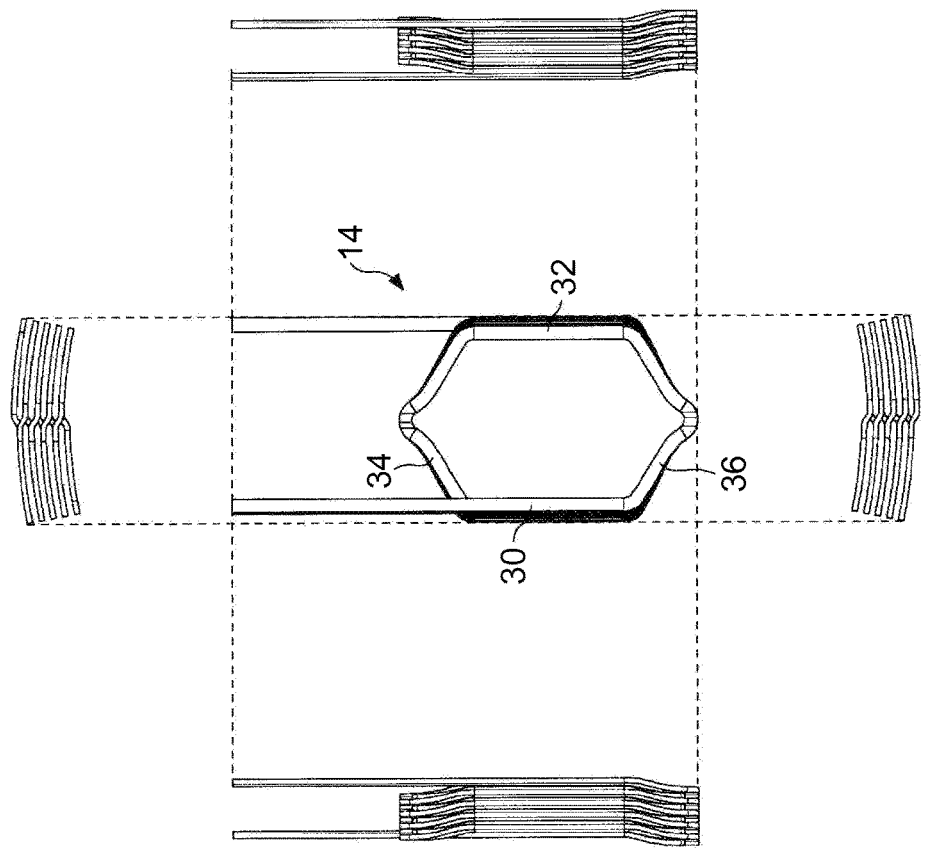
Figure 4B:
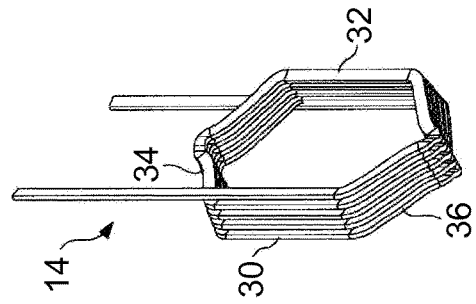

FIG. 1 shows configuration diagrams of a stator on which a coil assembly comprised of concentric winding coils as an embodiment of the present disclosure is mounted. FIG. 1A shows the state before completion of assembly of the stator, and FIG. 1B shows the state after completion of assembly of the stator. FIG. 2 shows diagrams illustrating a method for forming the coil assembly by using a plurality of concentric winding coils of the present embodiment. FIG. 2A shows the state before completion of attachment of two concentric winding coils, and FIG. 2B shows the state after completion of attachment of the two concentric winding coils. FIG. 3 shows configuration diagrams before completion of formation of the concentric winding coil of the embodiment. FIG. 4 shows configuration diagrams after completion of formation of the concentric winding coil of the embodiment. FIGS. 3A, 3B, 4A, and 4B are perspective views, and FIGS. 3C and 4C are plan views.

In the present embodiment, a stator 10 is a stationary element for use in, e.g., rotating electrical machines such as a three-phase alternating current (AC) motor. The stator 10 is placed radially outward of a rotor as a rotary element with a predetermined air gap therebetween. The stator 10 generates a magnetic field that rotates the rotor, when a current is applied thereto. The stator 10 includes a stator core 12 and stator coils 14. The stator core 12 is a hollow cylindrical member. The stator core 12 may be formed by stacking in the axial direction a plurality of electromagnetic steel plates coated with an insulating material. A cylindrical yoke, which is made of compression molded soft magnetic powder coated with an insulating material, may be attached to the radially outer surface of the stator core 12.

The stator core 12 has an annular yoke 16 and teeth 18 protruding radially inward (toward the central axis) from the radially inner surface of the yoke 16. A plurality of (e.g., 96) teeth 18 are provided in the circumferential direction on the radially inner surface of the yoke 16 so as to be arranged at regular intervals in the circumferential direction. A slot 20 is formed between two teeth 18 which adjoin each other in the circumferential direction.

The stator coil 14 is wound around each tooth 18. A plurality of (e.g., 96) stator coils 14 are disposed in the circumferential direction radially inward of the stator core 12. The plurality of stator coils 14 disposed in the circumferential direction form a coil assembly 22. The plurality of stator coils 14 are arranged next to each other in the circumferential direction so that the coil assembly 22 has an annular shape. The coil assembly 22 is formed by arranging the slots 20 accommodating the plurality of stator coils 14 such that the slots 20 are shifted one by one in the circumferential direction. In each slot 20, two stator coils 14 separated from each other by a predetermined distance in the circumferential direction are placed on top of each other in a stacking direction (i.e., radial direction) in which the conductors of each stator coil 14 are wounded.

For example, in the case where the stator 10 is applied to a three-phase AC motor, each stator coil 14 forms one of U-phase, V-phase, and W-phase coils. In this case, the U-phase, V-phase, and W-phase coils as the stator coils 14 are wound around the teeth 18 in this order in the circumferential direction.

The stator core 12 is comprised of a plurality of (e.g., 48) segment cores 24 in the circumferential direction. That is, the stator core 12 is divided into the plurality of segment cores 24 in the circumferential direction. Each segment core 24 has the same shape. Specifically, each segment core 24 is shaped to have a part of the yoke 16 which corresponds to the same angle in the circumferential direction, and two of the teeth 18.

The stator 10 further includes insulating members 26 that ensure insulation between the stator core 12 and the stator coils 14. The insulating member 26 is provided for each segment core 24 of the stator core 12. The insulating member 26 is shaped so as to match the shape of the segment core 24. The insulating member 26 is made of paper, a resin (e.g., a thermosetting resin, a thermoplastic resin, etc.), etc., and forms a thin insulating layer between the segment core 24 and the stator coils 14.

Each segment core 24 having the insulating member 26 placed thereon is inserted radially from outside into the coil assembly 22 so that the stator coils 14 of the coil assembly 22 are placed in the slot 20 between the two teeth 18. The stator 10 comprised of the stator core 12 and the stator coils 14 is assembled by attaching all the segment cores 24 to the coil assembly 22.

The stator coil 14 is composed of a rectangular conductor having a quadrilateral (specifically, rectangular) section. Each of the plurality of stator coils 14 disposed in the circumferential direction is a concentric winding coil formed by bending a rectangular conductor wound in a predetermined plurality of (e.g., 5) turns. Hereinafter, the "rectangular conductor 28" refers to the rectangular conductor before completion of formation of the stator coil 14, and the "concentric winding coil 14" refers to the stator coil 14 after completion of formation.

The rectangular conductor 28 is formed into a substantially elliptical shape wound in the predetermined plurality of turns as shown in FIG. 3, by winding a single straight wire around an elliptical die of an elliptical winding apparatus. The rectangular conductor 28 preferably has rounded corners. The rectangular conductor 28 is made of a highly conductive metal such as, e.g., copper or aluminum. The concentric winding coil 14 is formed into a substantially hexagonal shape wound in the predetermined plurality of turns as shown in FIG. 4, by bending the substantially elliptical rectangular conductor 28 with a forming apparatus described in detail below.

The concentric winding coil 14 has slot portions 30, 32 and coil end portions 34, 36. The slot portions 30, 32 are portions to be accommodated in the slots 20 of the stator core 12. The coil end portions 34, 36 are portions protruding outward in the axial direction from both axial ends of the stator core 12. The slot portions 30, 32 extend substantially linearly so as to extend in the axial direction through the slots 20 that are different form each other and that are separated from each other by a predetermined distance in the circumferential direction of the stator core 12. The coil end portions 34, 36 are located axially outward of both axial ends of the stator cores 12 and are curved so as to connect the two slot portions 30, 32 in the circumferential direction.

The rectangular conductor 28 before completion of formation is formed so that its slot corresponding portions corresponding to the slot portions 30, 32 of the concentric winding coil 14 have a substantially linear shape, its coil end corresponding portions corresponding to the coil end portions 34, 36 of the concentric winding coil 14 substantially linearly connect the slot corresponding portions on both sides of the rectangular conductor 28, and the conductors located next to each other in the stacking direction extend parallel to each other. In each of the conductors located next to each other in the stacking direction of the rectangular conductor 28, the slot corresponding portions and the coil end corresponding portion corresponding to the coil end portion 36 are formed on the same plane. On the other hand, in each of the conductors located next to each other in the stacking direction of the rectangular conductor 28, the coil end corresponding portion corresponding to the coil end portion 34 obliquely connect the slot corresponding portions on both sides of the rectangular conductor 28 so that a lane change can be made by one lane in each of the conductors located next to each other in the stacking direction of the rectangular conductor 28.

Both ends of the concentric winding coil 14 protrude to the same side in the axial direction (hereinafter referred to as the "axial lead side") of both axial ends of the stator core 12 in order to connect to other concentric winding coils 14 or terminals. The coil end portion 34 is provided on the axial lead side, and the coil end portion 36 is provided on the opposite axial lead side, namely on the side opposite to the axial lead side. Hereinafter, the coil end portion 34 is referred to as the "lead-side coil end portion 34," and the coil end portion 36 is referred to as the "opposite lead-side coil end portion 36." The slot portion 30 is provided on one side in the circumferential direction, and the slot portion 32 is provided on the other side in the circumferential direction. Hereinafter, the slot portion 30 is referred to as the "one-side slot portion 30," and the slot portion 32 is referred to as the "other-side slot portion 32."

The slot portions 30, 32 are separated from each other in the circumferential direction perpendicular to the axial direction by a distance corresponding to a predetermined angle. The concentric winding coil 14 is formed so that a plurality of conductors are stacked in the direction of the shorter side of the section of the rectangular conductor 28. The concentric winding coil 14 is formed so that there is a predetermined clearance between the conductors adjoining each other in the stacking direction. The concentric winding coil 14 is formed in a trapezoidal section so that the distance between the slot portions 30, 32 varies according to the position in the stacking direction. The concentric winding coil 14 is formed in the trapezoidal section in order for the slot portions 30, 32 of the concentric winding coil 14 to be appropriately accommodated in the slots 20. The concentric winding coil 14 is attached to the stator core 12 so that the stacking direction of the conductors matches the radial direction perpendicular to the axial direction of the stator core 12.

For example, if the number of turns of the rectangular conductor 28 is "5" in the above concentric winding coil 14, the number of conductors that are stacked is 5 in the opposite lead-side coil end portion 36, the one-side slot portion 30, and the other-side slot portion 32, and the number of conductors that are stacked is 4 in the lead-side coil end portion 34.

Each of the coil end portions 34, 36 of the concentric winding coil 14 is formed into a plurality of different nonlinear shapes. Specifically, each of the coil end portions 34, 36 is formed into three different nonlinear shapes. Each of the coil end portions 34, 36 is formed into a crank shape so that the coil end portion 34, 36 is bent like a stair in the radial direction of the stator core 12 (crank formation), is formed into an arc shape so that the coil end portion 34, 36 is curved so as to correspond to the arc shape of the annular stator core 12 (arc formation), and is formed into a bent shape so that the coil end portion 34, 36 is bent in the longitudinal direction of the section of the rectangular conductor 28 (edgewise formation).

The crank formation and the arc formation are bending processes that are performed in the radial direction in the stacking direction in the rectangular conductor 28. The edgewise formation is a bending process that is performed in the perpendicular direction perpendicular to the stacking direction in the rectangular conductor 28. The crank formation is a bending process that is performed in order to make a lane change between the conductors in the stacking direction in the rectangular conductor 28. The arc formation is a bending process that is performed in order to efficiently accommodate the concentric winding coils 14 in the slots 20. The edgewise formation is a bending process that is performed in order to efficiently place the plurality of concentric winding coils 14 to form the coil assembly 22.

Formation of the concentric winding coil 14 according to the present embodiment will be described below with reference to FIGS. 5 to 11.

Figure 5A:
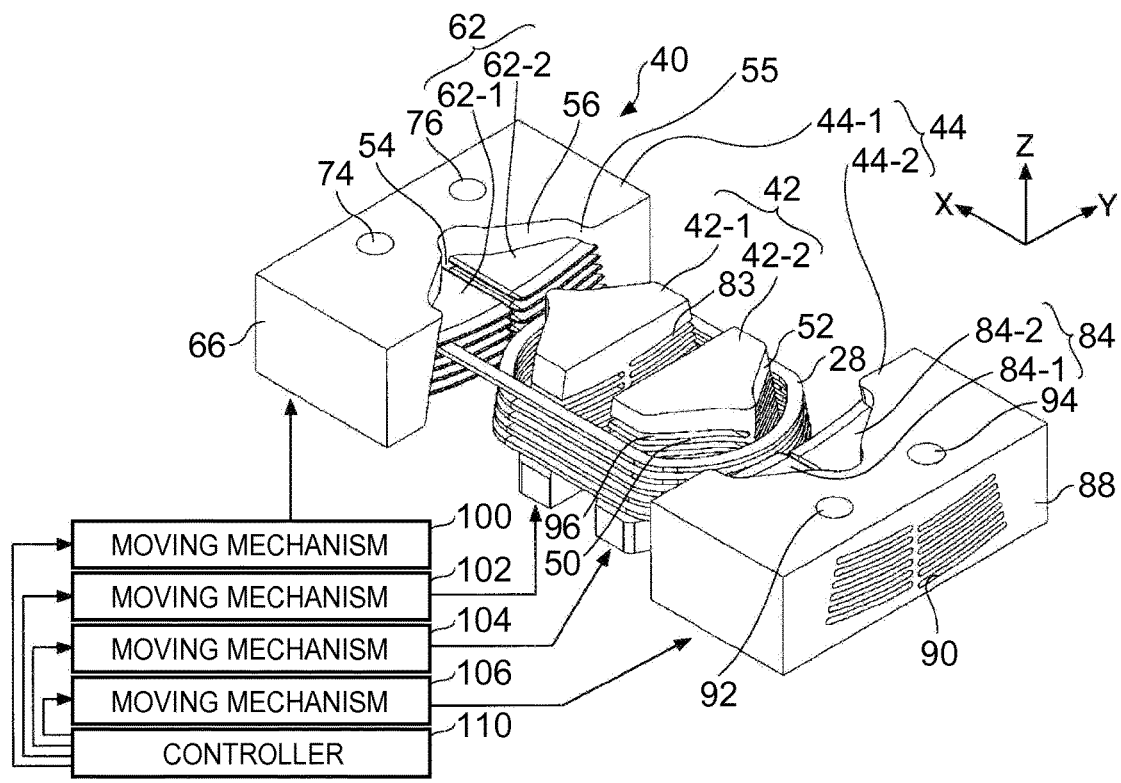
FIG. 5 shows perspective views an apparatus for forming a concentric winding coil according to the embodiment.
Figure 5B:
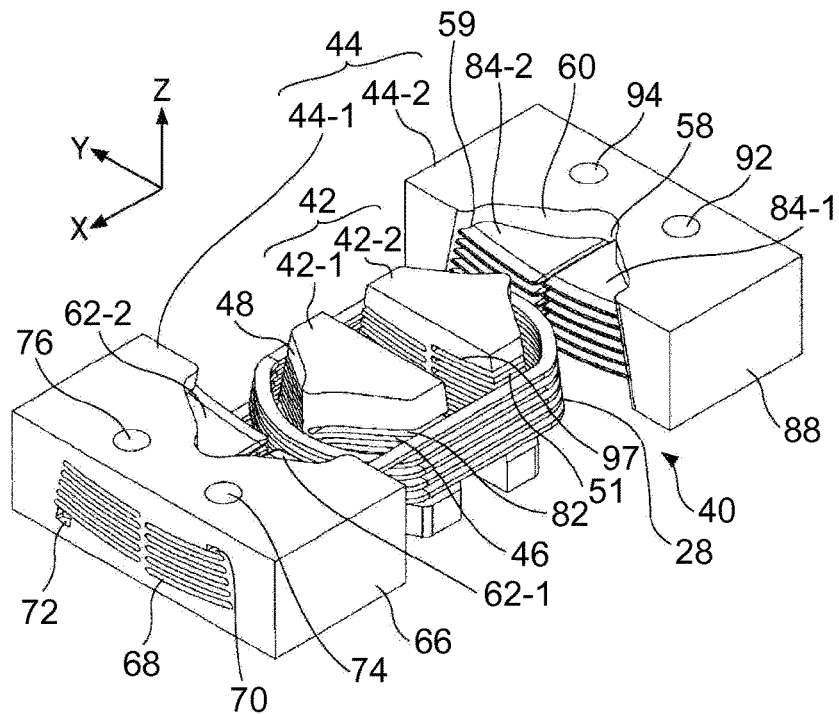
Figure 6:
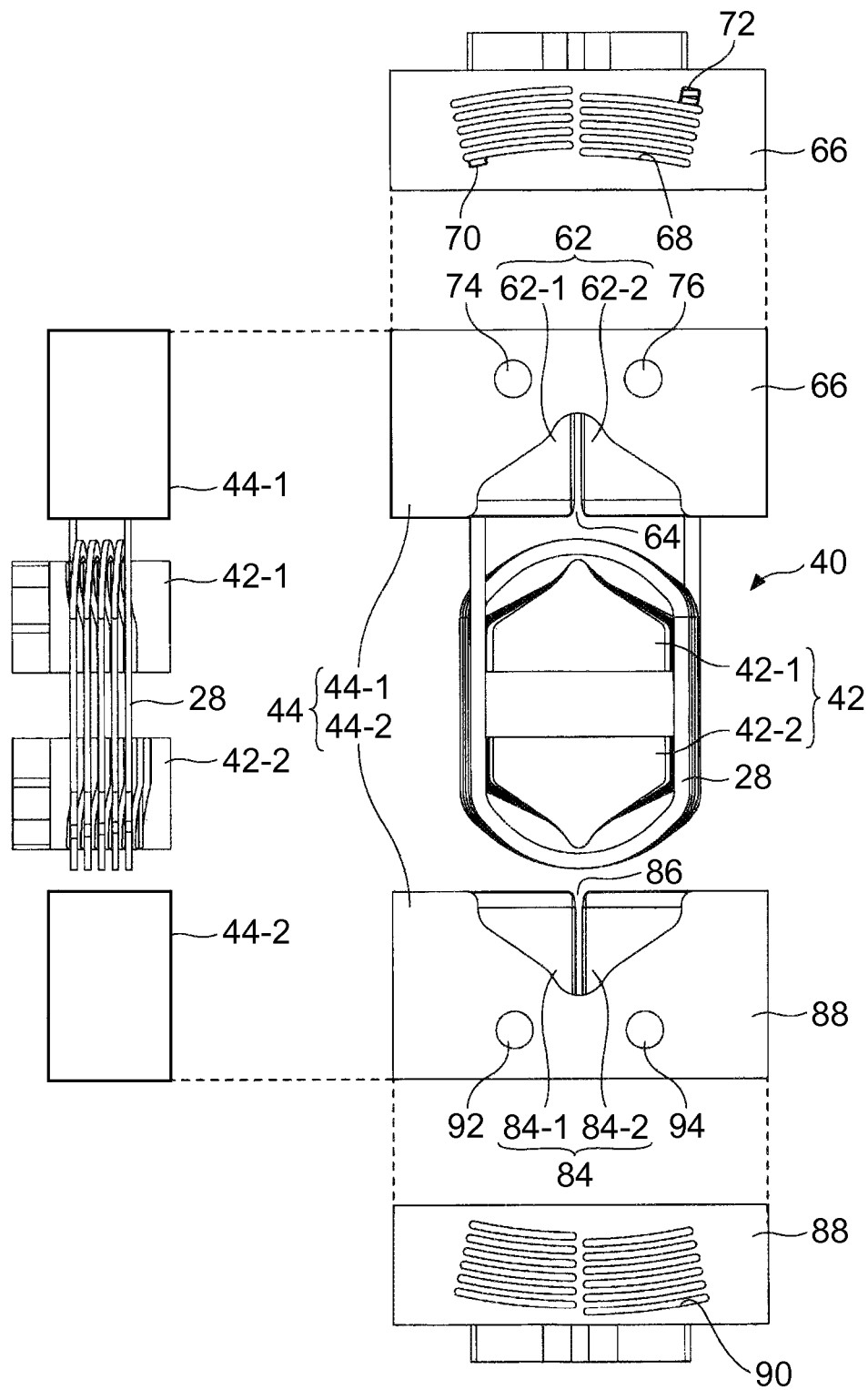
FIG. 6 is a plan view of the apparatus for forming a concentric winding coil according to the embodiment.
Figure 10A:
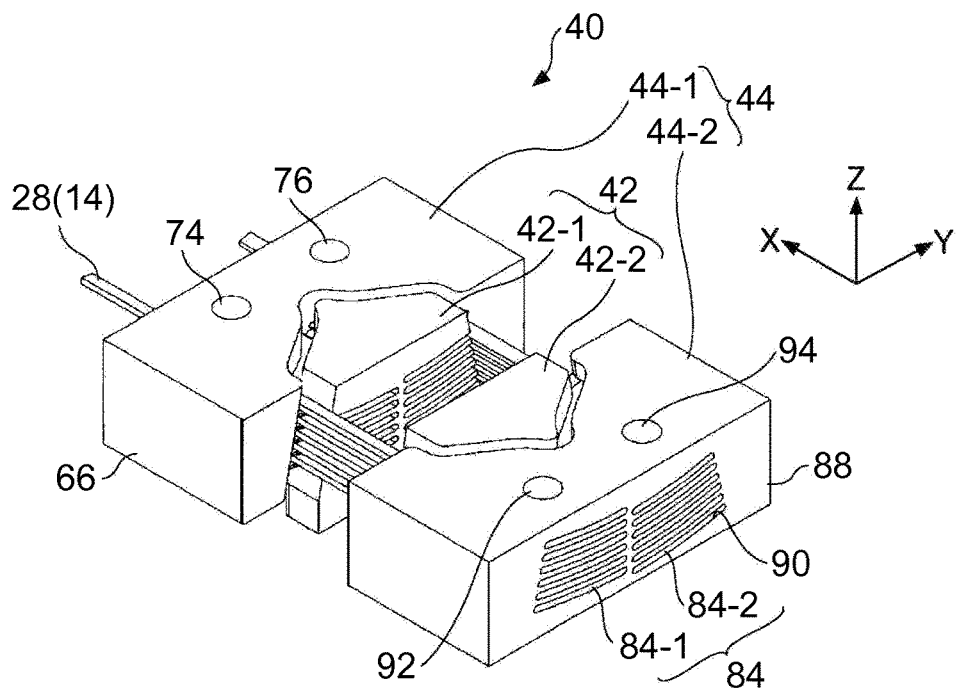
FIG. 10 shows perspective views after completion of formation by the apparatus for forming a concentric winding coil according to the embodiment.
Figure 10B:
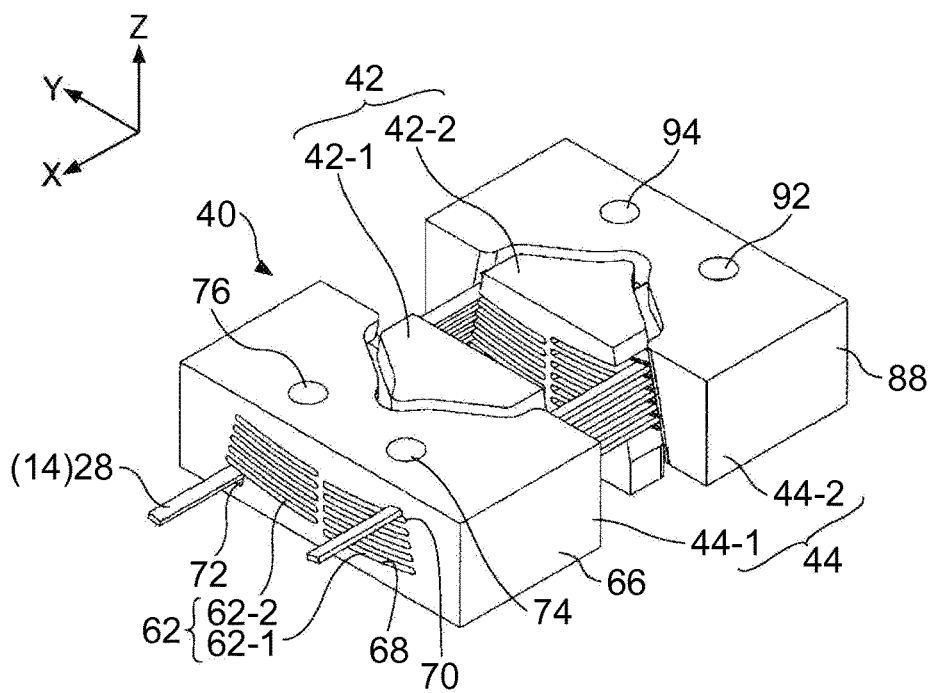
Figure 11:
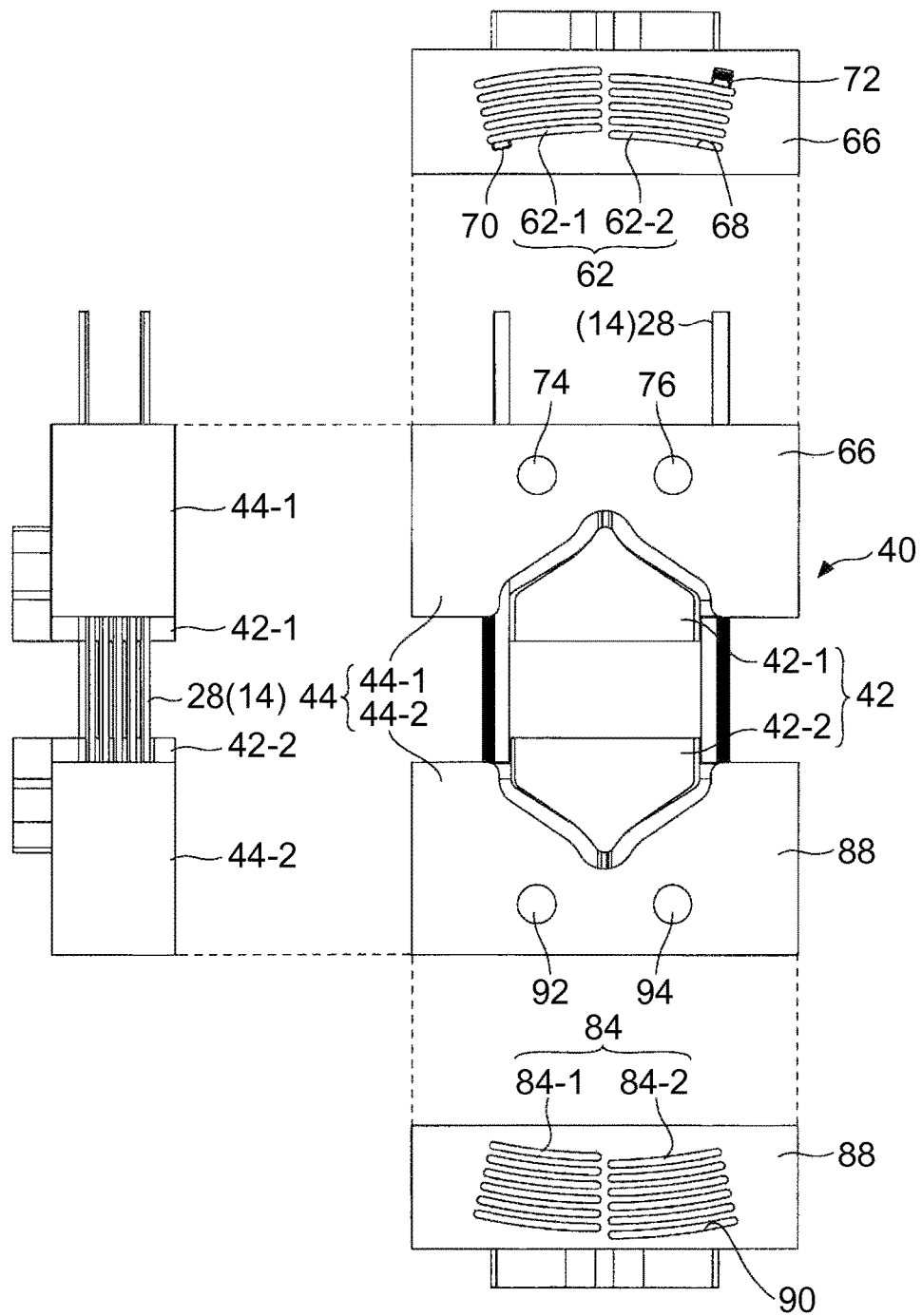
FIG. 11 is a plan view after completion of formation by the apparatus for forming a concentric winding coil according to the embodiment.

FIG. 5 shows perspective views of an apparatus for forming the concentric winding coil 14 according to the present embodiment. FIG. 5 shows the state before completion of formation of the concentric winding coil 14. FIG. 6 is a plan view of the apparatus for forming the concentric winding coil 14 according to the present embodiment. FIG. 7 shows configuration diagrams of a protruding die of an outer shape forming die included in the apparatus for forming the concentric winding coil 14 according to the present embodiment. FIG. 8 shows configuration diagrams of a recessed die of the outer shape forming die included in the apparatus for forming the concentric winding coil 14 according to the present embodiment. FIG. 9 shows configuration diagrams of a fin-shaped die included in the apparatus for forming the concentric winding coil 14 according to the present embodiment. FIGS. 7A, 8A, and 9A are perspective views, and FIGS. 7B, 8B, and 9B are plan views. FIG. 10 shows perspective views after completion of formation by the apparatus for forming the concentric winding coil 14 according to the present embodiment. FIG. 11 is a plan view after completion of formation by the apparatus for forming the concentric winding coil 14 according to the present embodiment.

In the present embodiment, the concentric winding coil 14 is formed by bending the substantially elliptical rectangular conductor 28 wound in the predetermined plurality of turns by using a forming apparatus 40. The forming apparatus 40 includes an inner die 42 and an outer die 44. The inner die 42 is a die that is placed inside the windings of the rectangular conductor 28 to be set, and that is capable of holding the rectangular conductor 28 being set on its outer peripheral surface. The outer die 44 is a die that is placed outside the windings of the rectangular conductor 28 to be set.

Hereinafter, in the forming apparatus 40, the first direction X refers to the direction (axial direction) connecting the coil end corresponding portions on both sides of the rectangular conductor 28 being set on the inner die 42, the second direction Y refers to the direction in which the slot corresponding portions on both sides of the rectangular conductor 28 being set on the inner die 42 are separated from each other, and the third direction Z refers to the stacking direction in the rectangular conductor 28 being set on the inner die 42. The first direction X, the second direction Y, and the third direction Z are perpendicular to each other.

The inner die 42 is comprised of a first inner die 42-1 and a second inner die 42-2. The first inner die 42-1 and the second inner die 42-2 are placed so as to be separated from each other in the first direction X. Each of the first inner die 42-1 and the second inner die 42-2 has a pentagonal mountain shape as viewed in the third direction Z. The first inner die 42-1 is a die provided on the axial lead side of the rectangular conductor 28 to be set, and the second inner die 42-2 is a die provided on the opposite axial lead side of the rectangular conductor 28 to be set.

The first inner die 42-1 is a protruding die having a processing surface 46 formed so as to correspond to the shape of the lead-side coil end portion 34 of the concentric winding coil 14 after completion of formation, and a processing surface 47 formed so as to correspond to the region around the boundary (shoulder portion) between the lead-side coil end portion 34 and the slot portions 30, 32 of the concentric winding coil 14.

The processing surface 46 is a surface facing in the first direction X, and is formed in a protruding surface 48 of the first inner die 42-1 which faces the lead-side coil end portion 34 of the concentric winding coil 14. The processing surface 46 is a surface to be in contact with the inner peripheral surface on the shorter side of the section of the lead-side coil end portion 34 of the concentric winding coil 14, namely the lead-side coil end corresponding portion of the rectangular conductor 28 which corresponds to the lead-side coil end portion 34. The processing surface 46 has an outer shape corresponding to the inner peripheral surface on the shorter side of the section of the lead-side coil end portion 34 of the concentric winding coil 14.

The processing surface 47 is a processing surface facing in a direction between the first direction X and the second direction Y, and is formed in the first inner die 42-1 so as to face the slot portions 30, 32 of the concentric winding coil 14. The processing surface 47 is a surface to be in contact with the inner peripheral surfaces on the shorter side of the sections of the slot portions 30, 32 of the concentric winding coil 14, namely the slot corresponding portions of the rectangular conductor 28 which correspond to the slot portions 30, 32. The processing surface 47 has an outer shape corresponding to the inner peripheral surfaces on the shorter side of the sections of the slot portions 30, 32 of the concentric winding coil 14.

The second inner die 42-2 is a protruding die having a processing surface 50 formed so as to correspond to the shape of the opposite lead-side coil end portion 36 of the concentric winding coil 14 after completion of formation, and a processing surface 51 formed so as to correspond to the region around the boundary (shoulder portion) between the opposite lead-side coil end portion 36 and the slot portions 30, 32 of the concentric winding coil 14.

The processing surface 50 is a surface facing in the first direction X, and is formed in a protruding surface 52 of the second inner die 42-2 which faces the opposite lead-side coil end portion 36 of the concentric winding coil 14. The processing surface 50 is a surface to be in contact with the inner peripheral surface on the shorter side of the section of the opposite lead-side coil end portion 36 of the concentric winding coil 14, namely the opposite lead-side coil end corresponding portion of the rectangular conductor 28 which corresponds to the opposite lead-side coil end portion 36. The processing surface 50 has an outer shape corresponding to the inner peripheral surface on the shorter side of the section of the opposite lead-side coil end portion 36 of the concentric winding coil 14.

The processing surface 51 is a processing surface facing in a direction between the first direction X and the second direction Y, and is formed in the second inner die 42-2 so as to face the slot portions 30, 32 of the concentric winding coil 14. The processing surface 51 is a surface to be in contact with the inner peripheral surfaces on the shorter side of the sections of the slot portions 30, 32 of the concentric winding coil 14, namely the slot corresponding portions of the rectangular conductor 28 which correspond to the slot portions 30, 32. The processing surface 51 has an outer shape corresponding to the inner peripheral surfaces on the shorter side of the sections of the slot portions 30, 32 of the concentric winding coil 14.

The outer die 44 is comprised of a first outer die 44-1 and a second outer die 44-2. The first outer die 44-1 and the second outer die 44-2 are placed so as to be separated from each other in the first direction X. The first outer die 44-1 is a die provided on the axial lead side of the rectangular conductor 28 to be set, and the second outer die 44-2 is a die provided on the opposite axial lead side of the rectangular conductor 28 to be set.

The first inner die 42-1 and the second inner die 42-2 are placed next to each other between the first outer die 44-1 and the second outer die 44-2 in the first direction X. That is, the first outer die 44-1, the first inner die 42-1, the second inner die 42-2, and the second outer die 44-2 are arranged in series in this order in the first direction X. The first outer die 44-1 and the first inner die 42-1 are placed so as to be separated from each other in the first direction X, and the second outer die 44-2 and the second inner die 42-2 are placed so as to be separated from each other in the first direction X.

The first outer die 44-1 is a recessed die having a processing surface 54 formed so as to correspond to the shape of the lead-side coil end portion 34 of the concentric winding coil 14 after completion of formation, and a processing surface 55 formed so as to correspond to the region around the boundary (shoulder portion) between the lead-side coil end portion 34 and the slot portions 30, 32 of the concentric winding coil 14. The first outer die 44-1 is paired with the first inner die 42-1.

The processing surface 54 is a surface facing in the first direction X, and is formed in a recessed surface 56 of the first outer die 44-1 which faces the lead-side coil end portion 34 of the concentric winding coil 14. The processing surface 54 is a surface to be in contact with the outer peripheral surface on the shorter side of the section of the lead-side coil end portion 34 of the concentric winding coil 14, namely the lead-side coil end corresponding portion of the rectangular conductor 28. The processing surface 54 has an outer shape corresponding to the outer peripheral surface on the shorter side of the section of the lead-side coil end portion 34 of the concentric winding coil 14.

The processing surface 55 is a processing surface facing in a direction between the first direction X and the second direction Y, and is formed in the first outer die 44-1 so as to face the slot portions 30, 32 of the concentric winding coil 14. The processing surface 55 is a surface to be in contact with the outer peripheral surfaces on the shorter side of the sections of the slot portions 30, 32 of the concentric winding coil 14, namely the slot corresponding portions of the rectangular conductor 28. The processing surface 55 has an outer shape corresponding to the outer peripheral surfaces on the shorter side of the sections of the slot portions 30, 32 of the concentric winding coil 14.

The second outer die 44-2 is a recessed die having a processing surface 58 formed so as to correspond to the shape of the opposite lead-side coil end portion 36 of the concentric winding coil 14 after completion of formation, and a processing surface 59 formed so as to correspond to the region around the boundary (shoulder portion) between the opposite lead-side coil end portion 36 and the slot portions 30, 32 of the concentric winding coil 14. The second outer die 44-2 is paired with the second inner die 42-2.

The processing surface 58 is a surface facing in the first direction X, and is formed in a recessed surface 60 of the second outer die 44-2 which faces the opposite lead-side coil end portion 36 of the concentric winding coil 14. The processing surface 58 is a surface to be in contact with the outer peripheral surface on the shorter side of the section of the opposite lead-side coil end portion 36 of the concentric winding coil 14, namely the opposite lead-side coil end corresponding portion of the rectangular conductor 28. The processing surface 58 has an outer shape corresponding to the outer peripheral surface on the shorter side of the section of the opposite lead-side coil end portion 36 of the concentric winding coil 14.

The processing surface 59 is a processing surface facing in a direction between the first direction X and the second direction Y, and is formed in the second outer die 44-2 so as to face the slot portions 30, 32 of the concentric winding coil 14. The processing surface 59 is a surface to be in contact with the outer peripheral surfaces on the shorter side of the sections of the slot portions 30, 32 of the concentric winding coil 14, namely the slot corresponding portions of the rectangular conductor 28. The processing surface 59 has an outer shape corresponding to the outer peripheral surfaces on the shorter side of the sections of the slot portions 30, 32 of the concentric winding coil 14.

The processing surface 46 of the first inner die 42-1 and the processing surface 54 of the first outer die 44-1 are formed in a shape suitable for edgewise formation of the lead-side coil end corresponding portion of the rectangular conductor 28. The first inner die 42-1 and the first outer die 44-1 are dies for edgewise formation of the lead-side coil end corresponding portion of the rectangular conductor 28. The processing surface 50 of the second inner die 42-2 and the processing surface 58 of the second outer die 44-2 are formed in a shape suitable for edgewise formation of the opposite lead-side coil end corresponding portion of the rectangular conductor 28. The second inner die 42-2 and the second outer die 44-2 are dies for edgewise formation of the opposite lead-side coil end corresponding portion of the rectangular conductor 28.

The first outer die 44-1 has a plurality of fins 62. The first outer die 44-1 having the plurality of fins 62 is a die for crank formation and arc formation of the lead-side coil end corresponding portion of the rectangular conductor 28. The plurality of fins 62 are arranged next to each other in the third direction Z, and are divided into two groups in the second direction Y. The fins 62 are divided into first fins 62-1 and second fins 62-2 in the second direction Y. There is a clearance 64 in the second direction Y between the first fins 62-1 and the second fins 62-2. The number of first fins 62-1 is the same as that of second fins 62-2.

The number of fins 62 that are arranged next to each other in the third direction Z (i.e., each of the number of first fins 62-1 and the number of second fins 62-2) is larger than the number of conductors that are stacked in the lead-side coil end corresponding portion of the rectangular conductor 28 by "1." For example, if the number of turns of the rectangular conductor 28 is "5," that is, if the number of conductors that are stacked in the lead-side coil end corresponding portion of the rectangular conductor 28 is "4," each of the number of fins 62 that are arranged next to each other in the third direction Z, the number of first fins 62-1, and the number of second fins 62-2 is "5."

Each of the first fins 62-1 and the second fins 62-2 is formed in the shape of a substantially quadrilateral plate, and is curved in an arc shape so as to correspond to the arc of the annular stator core 12 in the out-of-plane direction. All of the first fins 62-1 are placed so that their curved surfaces face each other in the third direction Z. All of the second fins 62-2 are placed so that their curved surfaces face each other in the third direction Z.

All of the first fins 62-1 and all of the second fins 62-2 of the first outer die 44-1 are arranged concentrically with each other so that clearances between the first fins 62-1 and clearances between the second fins 62-2 are formed in a transferred shape of the plurality of conductors that are stacked in the stacking direction in the lead-side coil end portion 34 of the concentric winding coil 14 (i.e., crank shape). This concentric arrangement of the first fins 62-1 and the second fins 62-2 is carried out so that the shape suitable for arc formation of the lead-side coil end corresponding portion of the rectangular conductor 28 is formed by the clearances between the first fins 62-1 and the clearances between the second fins 62-2.

All of the first fins 62-1 and all of the second fins 62-2 are arranged so that the ends on the clearance 64 side of the first fins 62-1 obliquely face the ends on the clearance 64 side of the second fins 62-2 in the second direction Y. This oblique arrangement of the first fins 62-1 and the second fins 62-2 is carried out so that the shape suitable for crank formation of the lead-side coil end corresponding portion of the rectangular conductor 28 is formed by the clearance 64 between the first fins 62-1 and the second fins 62-2. Specifically, this oblique arrangement of the first fins 62-1 and the second fins 62-2 is carried out so that a lane change can be made by 0.5 lanes between the slot portions 30, 32 on both sides by forming substantially the middle part in the second direction Y of the lead-side coil end portion 34 of the concentric winding coil 14 into the crank shape by the clearance 64 between the first fins 62-1 and the second fins 62-2.

Each of the first fins 62-1 and the second fins 62-2 is fixedly attached to a body 66 of the first outer die 44-1. The body 66 of the first outer die 44-1 has fin holes 68 to which the fins 62 are attached. The fin holes 68 are insertion holes that extend through the body 66 in the first direction X so that the first fins 62-1 and the second fins 62-2 are inserted from outside into the fin holes 68. The fin holes 68 open to the recessed surface 56 that has the processing surface 54 formed therein and that faces in the first direction X.

The fin hole 68 is formed for each of the first fins 62-1 and the second fins 62-2. The fin holes 68 are formed in an appropriate shape at such positions in the body 66 that all of the first fins 62-1 and all of the second fins 62-2 are appropriately placed as described above. For example, the fin holes 68 are formed so as to be curved in the third direction Z. The processing surface 54 is formed between the fin holes 68 in the recessed surface 56 of the first outer die 44-1.

The body 66 of the first outer die 44-1 further has extension holes 70, 72 through which substantially linear ends connecting to the slot corresponding portions of the rectangular conductor 28 are extended to the outside. The extension holes 70, 72 are insertion holes that extend through the body 66 in the first direction X so that both ends of the rectangular conductor 28 set on the first inner die 42-1 are inserted into the extension holes 70, 72. The extension holes 70, 72 are formed in an appropriate shape at such positions that both ends of the rectangular conductor 28 can be extended to the outside when the rectangular conductor 28 is appropriately set on the first inner die 42-1. The extension hole 70 is a hole through which the end on one slot portion 30 side of the rectangular conductor 28 is extended to the outside, and the extension hole 72 is a hole through which the end on the other slot portion 32 side of the rectangular conductor 28 is extended to the outside.

The body 66 of the first outer die 44-1 further has a bolt hole 74 for fixing the first fins 62-1 with a bolt, and a bolt hole 76 for fixing the second fins 62-2 with a bolt. Each of the first fins 62-1 has a bolt hole 78 for fixing the first fin 62-1 with the bolt. Each of the second fins 62-2 has a bolt hole 80 for fixing the second fin 62-2 with the bolt.

The first fins 62-1 are inserted into the fin holes 68 in the body 66 of the first outer die 44-1, and are then fastened by the bolts inserted in the bolt hole 74 in the body 66 and the bolt holes 78 in the first fins 62-1. The first fins 62-1 are thus fixedly attached to the body 66 of the first outer die 44-1. The second fins 62-2 are inserted into the fin holes 68 in the body 66 of the first outer die 44-1, and are then fastened by the bolts inserted in the bolt hole 76 in the body 66 and the bolt holes 80 in the second fins 62-2. The second fins 62-2 are thus fixedly attached to the body 66 of the first outer die 44-1. The first fins 62-1 and the second fins 62-2 protrude from the recessed surface 56 of the body 66 toward the first inner die 42-1 when fixedly attached to the body 66 of the first outer die 44-1.

The tip ends in the second direction Y of the first fins 62-1 which face the second fins 62-2 with the clearance 64 therebetween, and the tip ends in the first direction X of the first fins 62-1 which face the first inner die 42-1 have a tapered shape. The tip ends in the second direction Y of the second fins 62-2 which face the first fins 62-1 with the clearance 64 therebetween, and the tip ends in the first direction X of the second fins 62-2 which face the first inner die 42-1 also have a tapered shape. These tapered shapes of the fins 62 has a function to facilitate insertion of the conductors stacked in the stacking direction of the rectangular conductor 28 into the clearances between the fins 62 when performing crank formation and arc formation of the lead-side coil end corresponding portion of the rectangular conductor 28 in the third direction Z.

The first inner die 42-1 has through holes 82 extending therethrough in the first direction X. The through holes 82 open both in the first direction X and in the second direction Y. The through holes 82 are clearance holes in which the fins 62 protruding from the recessed surface 56 of the first outer die 44-1 toward the first inner die 42-1 are inserted in the process of forming the rectangular conductor 28 into the concentric winding coil 14. The through hole 82 is provided for each fin 62 (each of the first fins 62-1 and each of the second fins 62-2). The through holes 82 are formed in an appropriate shape at such positions in the first inner die 42-1 that all of the fins 62 provided in the first outer die 44-1 are appropriately inserted into the through holes 82.

The first inner die 42-1 has fin-shaped portions 83 formed in the shape of a fin due to the presence of the plurality of through holes 82. The number of fin-shaped portions 83 is the same as that of conductors stacked in the stacking direction of the rectangular conductor 28. In the protruding surface 48 of the first inner die 42-1, the processing surface 46 is formed between the through holes 82. The processing surface 46 is the surfaces of the fin-shaped portions 83 in the first inner die 42-1 which face in the first direction X.

The second outer die 44-2 has a plurality of fins 84. The second outer die 44-2 having the plurality of fins 84 is a die for crank formation and arc formation of the opposite lead-side coil end corresponding portion of the rectangular conductor 28. The plurality of fins 84 are arranged next to each other in the third direction Z, and are divided into two groups in the second direction Y. The fins 84 are divided into third fins 84-1 and fourth fins 84-2 in the second direction Y. There is a clearance 86 in the second direction Y between the third fins 84-1 and the fourth fins 84-2. The number of third fins 84-1 is the same as that of fourth fins 84-2.

The number of fins 84 that are arranged next to each other in the third direction Z (i.e., each of the number of third fins 84-1 and the number of fourth fins 84-2) is larger than the number of conductors that are stacked in the opposite lead-side coil end corresponding portion of the rectangular conductor 28 by "1." For example, if the number of turns of the rectangular conductor 28 is "5," that is, if the number of conductors that are stacked in the opposite lead-side coil end corresponding portion of the rectangular conductor 28 is "5," each of the number of fins 84 that are arranged next to each other in the third direction Z, the number of third fins 84-1, and the number of fourth fins 84-2 is "6."

Each of the third fins 84-1 and the fourth fins 84-2 is formed in the shape of a substantially quadrilateral plate, and is curved in an arc shape so as to correspond to the arc of the annular stator core 12 in the out-of-plane direction. All of the third fins 84-1 are placed so that their curved surfaces face each other in the third direction Z. All of the fourth fins 84-2 are placed so that their curved surfaces face each other in the third direction Z.

All of the third fins 84-1 and all of the fourth fins 84-2 of the second outer die 44-2 are arranged concentrically with each other so that clearances between the third fins 84-1 and clearances between the fourth fins 84-2 are formed in a transferred shape of the plurality of conductors that are stacked in the stacking direction in the opposite lead-side coil end portion 36 of the concentric winding coil 14 (i.e., crank shape). This concentric arrangement of the third fins 84-1 and the fourth fins 84-2 is carried out so that the shape suitable for arc formation of the opposite lead-side coil end corresponding portion of the rectangular conductor 28 is formed by the clearances between the third fins 84-1 and the clearances between the fourth fins 84-2.

All of the third fins 84-1 and all of the fourth fins 84-2 are arranged so that the ends on the clearance 86 side of the third fins 84-1 obliquely face the ends on the clearance 86 side of the fourth fins 84-2 in the second direction Y. This oblique arrangement of the third fins 84-1 and the fourth fins 84-2 is carried out so that the shape suitable for crank formation of the opposite lead-side coil end corresponding portion of the rectangular conductor 28 is formed by the clearance 86 between the third fins 84-1 and the fourth fins 84-2. Specifically, this oblique arrangement of the third fins 84-1 and the fourth fins 84-2 is carried out so that a lane change can be made by 0.5 lanes between the slot portions 30, 32 on both sides by forming substantially the middle part in the second direction Y of the opposite lead-side coil end portion 36 of the concentric winding coil 14 into the crank shape by the clearance 86 between the third fins 84-1 and the fourth fins 84-2.

Each of the third fins 84-1 and the fourth fins 84-2 is fixedly attached to a body 88 of the second outer die 44-2. The body 88 of the second outer die 44-2 has fin holes 90 to which the fins 84 are attached. The fin holes 90 are insertion holes that extend through the body 88 in the first direction X so that the third fins 84-1 and the second fins 84-2 are inserted from outside into the fin holes 90. The fin holes 90 open to the recessed surface 60 that has the processing surface 58 formed therein and that faces in the first direction X.

The fin hole 90 is formed for each of the third fins 84-1 and the fourth fins 84-2. The fin holes 90 are formed in an appropriate shape at such positions in the body 88 that all of the third fins 84-1 and all of the fourth fins 84-2 are appropriately placed as described above. For example, the fin holes 90 are formed so as to be curved in the third direction Z. The processing surface 58 is formed between the fin holes 90 in the recessed surface 60 of the second outer die 44-2.

The body 88 of the second outer die 44-2 further has a bolt hole 92 for fixing the third fins 84-1 with a bolt, and a bolt hole 94 for fixing the fourth fins 84-2 with a bolt. Each of the third fins 84-1 has a bolt hole (not shown) for fixing the third fin 84-1 with the bolt. Each of the fourth fins 84-2 has a bolt hole (not shown) for fixing the fourth fin 84-2 with the bolt.

The third fins 84-1 are inserted into the fin holes 90 in the body 88 of the second outer die 44-2, and are then fastened by the bolts inserted in the bolt hole 92 in the body 88 and the bolt holes in the third fins 84-1. The third fins 84-1 are thus fixedly attached to the body 88 of the second outer die 44-2. The fourth fins 84-2 are inserted into the fin holes 90 in the body 88 of the second outer die 44-2, and are then fastened by the bolts inserted in the bolt hole 94 in the body 88 and the bolt holes in the fourth fins 84-2. The fourth fins 84-2 are thus fixedly attached to the body 88 of the second outer die 44-2. The third fins 84-1 and the fourth fins 84-2 protrude from the recessed surface 60 of the body 88 toward the second inner die 42-2 when fixedly attached to the body 88 of the second outer die 44-2.

The tip ends in the second direction Y of the third fins 84-1 which face the fourth fins 84-2 with the clearance 86 therebetween, and the tip ends in the first direction X of the third fins 84-1 which face the second inner die 42-2 have a tapered shape. The tip ends in the second direction Y of the fourth fins 84-2 which face the third fins 84-1 with the clearance 86 therebetween, and the tip ends in the first direction X of the fourth fins 84-2 which face the second inner die 42-2 also have a tapered shape. These tapered shapes of the fins 84 has a function to facilitate insertion of the conductors stacked in the stacking direction of the rectangular conductor 28 into the clearances between the fins 84 when performing crank formation and arc formation of the opposite lead-side coil end corresponding portion of the rectangular conductor 28 in the third direction Z.

The second inner die 42-2 has through holes 96 extending therethrough in the first direction X. The through holes 96 open both in the first direction X and in the second direction Y. The through holes 96 are clearance holes in which the fins 84 protruding from the recessed surface 60 of the second outer die 44-2 toward the second inner die 42-2 are inserted in the process of forming the rectangular conductor 28 into the concentric winding coil 14. The through hole 96 is provided for each fin 84 (each of the third fins 84-1 and each of the fourth fins 84-2). The through holes 96 are formed in an appropriate shape at such positions in the second inner die 42-2 that all of the fins 84 provided in the second outer die 44-2 are appropriately inserted into the through holes 96.

The second inner die 42-2 has fin-shaped portions 97 formed in the shape of a fin due to the presence of the plurality of through holes 96. The number of fin-shaped portions 97 is the same as that of conductors stacked in the stacking direction of the rectangular conductor 28. In the protruding surface 52 of the second inner die 42-2, the processing surface 50 is formed between the through holes 96. The processing surface 50 is the surfaces of the fin-shaped portions 97 in the second inner die 42-2 which face in the first direction X.

In the above forming apparatus 40, as described above, the first outer die 44-1, the first inner die 42-1, the second inner die 42-2, and the second outer die 44-2 are arranged in series in this order in the first direction X. The first outer die 44-1, the first inner die 42-1, the second inner die 42-2, and the second outer die 44-2 are attached so as to be able to make a stroke movement in the first direction X with respect to a base.

The first outer die 44-1 is caused to make a stroke movement in the first direction X with respect to the base by a moving mechanism 100. The first inner die 42-1 is caused to make a stroke movement in the first direction X with respect to the base by a moving mechanism 102. The second inner die 42-2 is caused to make a stroke movement in the first direction X with respect to the base by a moving mechanism 104. The second outer die 44-2 is caused to make a stroke movement in the first direction X with respect to the base by a moving mechanism 106. A controller 110 formed mainly by a microcomputer is electrically connected to the moving mechanisms 100, 102, 104, 106.

The controller 110 is a control apparatus that causes the forming apparatus 40 to perform an operation required to bend the rectangular conductor 28 set in the forming apparatus 40 to form the concentric winding coil 14. The controller 110 sends such an operation command to the moving mechanisms 100, 102, 104, 106. The controller 110 may send such an operation command when a predetermined switch operation is performed after the rectangular conductor 28 is set in the forming apparatus 40. The moving mechanisms 100, 102, 104, 106 cause the dies 44-1, 42-1, 42-2, 44-2 to make a stroke movement in the first direction X with respect to the base according to the command from the controller 110.

In the present embodiment, all of the first inner die 42-1, the second inner die 42-2, the first outer die 44-1, and the second outer die 44-2 are moved in the first direction X by the moving mechanism 100, 102, 104, 106. However, any of the dies 42-1, 42-2, 44-1, 44-2 may be held stationary with respect to the base.

In the present embodiment, before the rectangular conductor 28 is set in the forming apparatus 40, the first outer die 44-1 and the second outer die 44-2 are moved so as to be separated from each other by a predetermined maximum distance, and the first inner die 42-1 and the second inner die 42-2 are moved so as to be separated from each other by a predetermined minimum distance. At this time, a clearance large enough to set the rectangular conductor 28 is provided in the first direction between the first outer die 44-1 and the first inner die 42-1 and between the second outer die 44-2 and the second inner die 42-2.

In this state, the substantially elliptical rectangular conductor 28 is set on the inner die 42. At this time, the rectangular conductor 28 is held on the outer peripheral surfaces of the first inner die 42-1 and the second inner die 42-2. Moreover, the rectangular conductor 28 is held so that its position in the third direction Z is optimal for bending the rectangular conductor 28 by the inner die 42 and the outer die 44.

After the rectangular conductor 28 is set on the inner die 42 as described above, the first inner die 42-1 and the second inner die 42-2 are caused to make a stroke movement in the first direction X so as to be separated from each other, the first outer die 44-1 is caused to make a stroke movement in the first direction X so as to approach the first inner die 42-1, and the second outer die 44-2 is caused to make a stroke movement in the first direction X so as to approach the second inner die 42-2.

That is, after the rectangular conductor 28 is set, the first inner die 42-1 and the first outer die 44-1 are caused to make a stroke movement in the first direction X so as to approach each other and to sandwich the lead-side coil end corresponding portion of the rectangle conductor 28 therebetween, and the second inner die 42-2 and the second outer die 44-2 are caused to make a stroke movement in the first direction X so as to approach each other and to sandwich the opposite lead-side coil end corresponding portion of the rectangle conductor 28 therebetween.

The stroke movement of the first inner die 42-1 and the stroke movement of the second inner die 42-2 are made substantially simultaneously, and the stroke movement of the first outer die 44-1 and the stroke movement of the second outer die 44-2 are made substantially simultaneously. Moreover, the stroke movement of the first inner die 42-1 is made synchronously with the stroke movement of the first outer die 44-1, and the stroke movement of the second inner die 42-2 is made synchronously with the stroke movement of the second outer die 44-2.

In the process of causing the first outer die 44-1 to make a stroke movement in the first direction X so as to approach the first inner die 42-1, the conductors stacked in the third direction Z in the lead-side coil end corresponding portion of the rectangular conductor 28 held on the inner die 42 enter the clearances between the fins 62 of the first outer die 44-1. During such a stroke movement, the fins 62 of the first outer die 44-1 are inserted into the through holes 82 of the first inner die 42-1.

As described above, the tip ends in the second direction Y of the first and second fins 62-1, 62-2 which face the second or first fins 62-2, 62-1 with the clearance 64 therebetween, and the tip ends in the first direction X of the first and second fins 62-1, 62-2 which face the first inner die 42-1 have a tapered shape. The taper surfaces of the tip ends of the fins 62 of the first outer die 44-1 allow the stacked conductors in the lead-side coil end corresponding portion of the rectangular conductor 28 to smoothly enter the clearances between the fins 62, and thus facilitate insertion of these conductors into the clearances between the fins 62.

When the conductors that are stacked in the lead-side coil end corresponding portion of the rectangular conductor 28 enter the clearances between the fins 62 of the first outer die 44-1, substantially the middle parts in the second direction Y of the stacked conductors first enter the clearance 64 between the first fins 62-1 and the second fins 62-2. Then, the stacked conductors gradually enter the clearances between the fins 62 from substantially the middle part in the second direction Y toward both outer ends.

Each of the conductors that are stacked in the lead-side coil end corresponding portion of the rectangular conductor 28 extends obliquely between the slot corresponding portions on both sides so as to make a lane change by one lane. In the first outer die 44-1, the fins 62 are arranged so that a lane change can be made by 0.5 lanes between the slot portions 30, 32 on both sides by forming substantially the middle part in the second direction Y of the lead-side coil end portion 34 of the concentric winding coil 14 into the crank shape by the clearance 64 between the first fins 62-1 and the second fins 62-2.

Therefore, when the conductors that are stacked in the lead-side coil end corresponding portion of the rectangular conductor 28 enter the clearances between the fins 62 of the first outer die 44-1, substantially the middle parts in the second direction Y of the stacked conductors in the lead-side coil end corresponding portion of the rectangular conductor 28 are guided by the corners of the tip ends of the first fins 62-1 and the corners of the tip ends of the second fins 62-2 to fit in the clearances between the first fins 62-1 adjoining each other in the third direction Z and the clearances between the second fins 62-2 adjoining each other in the third direction Z so as to connect the clearances between the first fins 62-1 with the clearances between the second fins 62-2. In this case, substantially the middle parts in the second direction Y of the stacked conductors in the lead-side coil end corresponding portion of the rectangular conductor 28 are bent into a crank shape so as to have a stepped portion in the third direction Z (crank formation).

The fins 62 are fixedly attached to the first outer die 44-1 so as to be curved in the third direction Z and to be disposed concentrically with each other. Accordingly, when the first outer die 44-1 is caused to make a stroke movement in the first direction X so as to approach the first inner die 42-1 and the entry of the stacked conductors in the lead-side coil end corresponding portion of the rectangular conductor 28 into the clearances between the fins 62 proceeds accordingly, the entire lead-side coil end corresponding portion of the rectangular conductor 28 fits in the clearances between the first fins 62-1 adjoining each other in the third direction Z and the clearances between the second fins 62-2 adjoining each other in the third direction Z. The lead-side coil end corresponding portion of the rectangular conductor 28 is thus bent into an arc shape so as to be curved according to the arc of the annular stator core 12 (arc formation).

Moreover, each of the processing surface 46 of the first inner die 42-1 and the processing surface 54 of the first outer die 44-1 is formed in a shape suitable for edgewise formation of the lead-side coil end corresponding portion of the rectangular conductor 28. Accordingly, if the entry of the stacked conductors in the lead-side coil end corresponding portion of the rectangular conductor 28 into the clearances between the fins 62 proceeds after the lead-side coil end corresponding portion of the rectangular conductor 28 contacts both the protruding surface 48 of the first inner die 42-1 and the recessed surface 56 of the first outer die 44-1, the short sides in section of the lead-side coil end corresponding portion of the rectangular conductor 28 are pressed in the first direction X by the processing surface 46 of the first inner die 42-1 and the processing surface 54 of the first outer die 44-1 and is held therebetween (FIG. 10). In this case, the entire lead-side coil end corresponding portion of the rectangular conductor 28 is bent into a bent shape in an XY plane perpendicular to the third direction Z (edgewise formation).

Similarly, in the process of causing the second outer die 44-2 to make a stroke movement in the first direction X so as to approach the second inner die 42-2, the conductors stacked in the third direction Z in the opposite lead-side coil end corresponding portion of the rectangular conductor 28 held on the inner die 42 enter the clearances between the fins 84 of the second outer die 44-2. During such a stroke movement, the fins 84 of the second outer die 44-2 are inserted into the through holes 96 of the second inner die 42-2.

As described above, the tip ends in the second direction Y of the third and fourth fins 84-1, 84-2 which face the fourth or third fins 84-2, 84-1 with the clearance 86 therebetween, and the tip ends in the first direction X of the third and fourth fins 84-1, 84-2 which face the second inner die 42-2 have a tapered shape. The taper surfaces of the tip ends of the fins 84 of the second outer die 44-2 allow the stacked conductors in the opposite lead-side coil end corresponding portion of the rectangular conductor 28 to smoothly enter the clearances between the fins 84, and thus facilitate insertion of these conductors into the clearances between the fins 84.

When the conductors that are stacked in the opposite lead-side coil end corresponding portion of the rectangular conductor 28 enter the clearances between the fins 84 of the second outer die 44-2, substantially the middle parts in the second direction Y of the stacked conductors first enter the clearance 86 between the third fins 84-1 and the fourth fins 84-2. Then, the stacked conductors gradually enter the clearances between the fins 84 from substantially the middle part in the second direction Y toward both outer ends.

Each of the conductors that are stacked in the opposite lead-side coil end corresponding portion of the rectangular conductor 28 is formed on the same plane as that between the slot corresponding portions on both side. In the second outer die 44-2, the fins 84 are arranged so that a lane change can be made by 0.5 lanes between the slot portions 30, 32 on both sides by forming substantially the middle part in the second direction Y of the opposite lead-side coil end portion 36 of the concentric winding coil 14 into the crank shape by the clearance 86 between the third fins 84-1 and the fourth fins 84-2.

Therefore, when the conductors that are stacked in the opposite lead-side coil end corresponding portion of the rectangular conductor 28 enter the clearances between the fins 84 of the second outer die 44-2, substantially the middle parts in the second direction Y of the stacked conductors in the opposite lead-side coil end corresponding portion of the rectangular conductor 28 are guided by the corners of the tip ends of the third fins 84-1 and the corners of the tip ends of the fourth fins 84-2 to fit in the clearances between the third fins 84-1 adjoining each other in the third direction Z and the clearances between the fourth fins 84-2 adjoining each other in the third direction Z so as to connect the clearances between the third fins 84-1 with the clearances between the fourth fins 84-2. In this case, substantially the middle parts in the second direction Y of the stacked conductors in the opposite lead-side coil end corresponding portion of the rectangular conductor 28 are bent into a crank shape so as to have a stepped portion in the third direction Z (crank formation).

The fins 84 are fixedly attached to the second outer die 44-2 so as to be curved in the third direction Z and to be disposed concentrically with each other. Accordingly, when the second outer die 44-2 is caused to make a stroke movement in the first direction X so as to approach the second inner die 42-2 and the entry of the stacked conductors in the opposite lead-side coil end corresponding portion of the rectangular conductor 28 into the clearances between the fins 84 proceeds accordingly, the entire opposite lead-side coil end corresponding portion of the rectangular conductor 28 fits in the clearances between the third fins 84-1 adjoining each other in the third direction Z and the clearances between the fourth fins 84-2 adjoining each other in the third direction Z. The opposite lead-side coil end corresponding portion of the rectangular conductor 28 is thus bent into an arc shape so as to be curved according to the arc of the annular stator core 12 (arc formation).

Moreover, each of the processing surface 50 of the second inner die 42-2 and the processing surface 58 of the second outer die 44-2 is formed in a shape suitable for edgewise formation of the opposite lead-side coil end corresponding portion of the rectangular conductor 28. Accordingly, if the entry of the stacked conductors in the opposite lead-side coil end corresponding portion of the rectangular conductor 28 into the clearances between the fins 84 proceeds further after the opposite lead-side coil end corresponding portion of the rectangular conductor 28 contacts both the protruding surface 52 of the second inner die 42-2 and the recessed surface 60 of the second outer die 44-2, the short sides in section of the opposite lead-side coil end corresponding portion of the rectangular conductor 28 are pressed in the first direction X by the processing surface 50 of the second inner die 42-2 and the processing surface 58 of the second outer die 44-2 and is held therebetween (FIG. 10). In this case, the entire opposite lead-side coil end corresponding portion of the rectangular conductor 28 is bent into a bent shape in an XY plane perpendicular to the third direction Z (edgewise formation).

When such edgewise formation of both the lead-side coil end corresponding portion and the opposite lead-side coil end corresponding portion of the rectangular conductor 28 is completed, the first outer die 44-1 is then caused to make a stroke movement in the first direction X so as to be separated from the first inner die 42-1, the second outer die 44-2 is caused to make a stroke movement in the first direction X so as to be separated from the second inner die 42-2, and the first inner die 42-1 and the second inner die 42-2 are caused to make a stroke movement in the first direction so as to approach each other. The stroke movement of the first outer die 44-1 and the stroke movement of the second outer die 44-2 are made substantially simultaneously.

By such stroke movements, the rectangular conductor 28 whose coil end corresponding portions have been bent into the crank shape in the third direction Z, bent into the arc shape in the third direction Z, and bent into the bent shape in the XY plane perpendicular to the third direction Z is released from the outer peripheral surfaces of the first inner die 42-1 and the second inner die 42-2. Accordingly, the concentric winding coil 14 after completion of formation can be removed thereafter.

As described above, in the present embodiment, crank formation, arc formation, and edgewise formation can be performed on the coil end corresponding portions of the substantially elliptical rectangular conductor 28 where the plurality of conductors are stacked, by causing the inner die 42 and the outer die 44 of the forming apparatus 40 to make a stroke movement. As a result, the substantially hexagonal concentric winding coil 14 can be formed in which each of the coil end portions 34, 36 where the plurality of conductors are stacked has a plurality of different nonlinear shapes.

In this configuration, the inner die 42 and the outer die 44 of the forming apparatus 40 need only be caused to make a stroke movement in the first direction X, in order to form the substantially elliptical rectangular conductor 28 into the substantially hexagonal concentric winding coil 14 in which each of the coil end portions 34, 36 has the plurality of different nonlinear shapes. Each of the conductors stacked in the stacking direction in the coil end portions 34, 36 of the concentric winding coil 14 can be substantially simultaneously formed into the plurality of different nonlinear shapes, and the inner die 42 and the outer die 44 of the forming apparatus 40 need only be caused to make a stroke movement in the first direction X in order to form each of the conductors into the plurality of different nonlinear shapes.

That is, in one step of causing the inner die 42 and the outer die 44 of the forming apparatus 40 to make a stroke movement in the first direction X, the conductors stacked in the stacking direction in the coil end corresponding portions of the substantially elliptical rectangular conductor 28 are bent at a time. Each of the coil end portions 34, 36 of the substantially hexagonal concentric winding coil 14 in which the plurality of conductors are stacked can thus be formed into the plurality of different nonlinear shapes.

In this respect, according to the forming method using the forming apparatus 40 of the present embodiment, the substantially hexagonal concentric winding coil 14 in which each of the coil end portions 34, 36 has the plurality of different nonlinear shapes can be formed from the substantially elliptical rectangular conductor 28 without requiring separate dies or jigs for forming the individual nonlinear shapes (specifically, the crank shape, the arc shape, and the bent shape), and without requiring a plurality of processes and separate transport facilities between the processes etc.

Accordingly, the present embodiment can prevent an increase in the number of facilities such as dies and jigs and an increase in cost in forming the coil end portions 34, 36 of the concentric winding coil 14 into the plurality of different nonlinear shapes, and can prevent an increase in installation space for facilities. According to the present embodiment, the concentric winding coil 14 in which each of the coil end portions 34, 36 has the plurality of different nonlinear shapes can be formed by using a simple configuration.

According to the present embodiment, both the coil end portions 34, 36 of the concentric winding coil 14 can be substantially simultaneously formed into the plurality of different nonlinear shapes. This can reduce the processing time required to process the rectangular conductor 28 when forming the substantially elliptical rectangular conductor 28 into the concentric winding coil 14 in which each of the coil end portions 34, 36 has the plurality of different nonlinear shapes.

In the present embodiment, edgewise formation of the coil end portions 34, 36 of the concentric winding coil 14 is performed after crank formation and arc formation, and the edgewise formation is performed with the conductors in the stacking direction of the rectangular conductor 28 being interposed between the fins 62, 84. Accordingly, since crank formation and arc formation are bending processes that are performed in the stacking direction of the rectangular conductor 28, especially deformation of the coil portions after completion of crank formation and arc formation can be suppressed during edgewise deformation as a bending process that is performed in the perpendicular direction perpendicular to the stacking direction of the rectangular conductor 28. The concentric winding coil 14 can thus be formed accurately.

According to the forming method using the forming apparatus 40 of the present embodiment, the conductors in the stacking direction need not be bent one by one in order to form the substantially elliptical rectangular conductor 28 wound in a plurality of turns into the substantially hexagonal concentric winding coil 14 in which each of the coil end portions 34, 36 having the plurality of stacked conductors has the plurality of different nonlinear shapes. This can reduce the processing time required to process the rectangular conductor 28 when forming the concentric winding coil 14 in which the plurality of conductors are stacked.

Moreover, according to the forming method using the forming apparatus 40 of the present embodiment, both of the coil end portions 34, 36 of the concentric winding coil 14 can be substantially simultaneously formed into the plurality of different nonlinear shapes. This can reduce the processing time required to process the rectangular conductor 28 when forming each of the coil end portions 34, 36 of the concentric winding coil 14 into the plurality of different nonlinear shapes, and can suppress deformation of the slot portions 30, 32 etc. connecting the coil end portions 34, 36 which can be caused in the case of forming the coil end portions 34, 36 separately.

As described above, the present embodiment can significantly reduce the processing time required to process the rectangular conductor 28 when forming the substantially hexagonal concentric winding coil 14 in which the plurality of conductors are stacked and each of the coil end portions 34, 36 has the plurality of different nonlinear shapes. The concentric winding coil 14 can thus be formed in a short time, and productivity of the concentric winding coil 14 can be improved.

According to the present embodiment, in the process of forming the substantially elliptical rectangular conductor 28 into the substantially hexagonal concentric winding coil 14 in which each of the coil end portion 34, 36 has the plurality of different nonlinear shapes, the rectangular conductor 28 to be processed need not be repeatedly attached and detached to and from a die or jig between the processes for forming the plurality of different nonlinear shapes. This can prevent the rectangular conductor 28 from being susceptible to scratching due to repeated attachment and detachment to and from a die or jig, and thus can suppress reduction in quality of the concentric winding coil 14.

In the present embodiment, when the conductors that are stacked in the coil end corresponding portions of the rectangular conductor 28 enter between the fins 62 and between the fins 84 of the outer die 44, substantially the middle parts in the second direction Y of the stacked conductors first enter the clearance 64 between the fins 62 and the clearances 85 between the fins 84. Then, the stacked conductors gradually enter the clearances between the fins 62 and the clearances between the fins 84 from substantially the middle part in the second direction Y toward both outer ends.

In this configuration, bending of the coil end corresponding portions of the rectangular conductor 28 proceeds from substantially the middle part in the second direction Y toward both outer ends of the coil end corresponding portions. Substantially the middle parts in the second direction Y of the coil end corresponding portions of the rectangular conductor 28 are formed into the crank shape. According to the present embodiment, unlike the configuration in which bending of the rectangular conductor 28 proceeds from both outer ends toward the middle parts in the second direction of the coil end corresponding portions, the unwanted conductors can therefore be prevented from gathering substantially in the middle parts in the second direction Y of the coil end corresponding portions of the rectangular conductor 28 when forming a desired crank shape substantially in the middle parts in the second direction Y. This can improve forming accuracy in forming the coil end portions 34, 36 of the concentric winding coil 14 into the plurality of different nonlinear shapes.

In the forming method and the forming apparatus 40 for forming the rectangle conductor 28 into the concentric winding coil 14 according to the present embodiment, the concentric winding coil 14 in which each of the coil end portions 34, 36 has the plurality of different nonlinear shapes can be easily and accurately formed in a short time.

In the above embodiment, the inner die 42 and the outer die 44 correspond to the "die" described in the claims, the coil end corresponding portions of the rectangular conductor 28 which correspond to the coil end portions 34, 36 correspond to the "corresponding portion" described in the claims, the outer die 44 having the fins 62, 84 corresponds to the "fin-shaped die" described in the claims, the first inner die 42-1, the second inner die 42-2, the first outer die 44-1, and the second outer die 44-2 which have the processing surfaces 46, 50, 54, 58 correspond to the "outer shape forming die" described in the claims, the first outer die 44-1 and the second outer die 44-2 correspond to the "recessed die," the "first recessed die," and the "second recessed die" described in the claims, and the first inner die 42-1 and the second inner die 42-2 correspond to the "protruding die," the "first protruding die," and the "second protruding die" described in the claims.

In the above embodiment, in the process of forming the substantially elliptical rectangular conductor 28 into the substantially hexagonal concentric winding coil 14 in which each of the coil end portion 34, 36 has the plurality of different nonlinear shapes, the first inner die 42-1 and the first outer die 44-1 are caused to make a stroke movement in the first direction X (normal direction) so as to approach each other and to sandwich (from inside and outside) the lead-side coil end corresponding portion of the rectangular conductor 28 in the first direction X, and the second inner die 42-2 and the second outer die 44-2 are caused to make a stroke movement in the first direction X (normal direction) so as to approach each other and to sandwich (from inside and outside) the opposite lead-side coil end corresponding portion of the rectangular conductor 28 in the first direction X. The first outer die 44-1 and the second outer die 44-2 are caused to make a stroke movement substantially simultaneously.

In the above process, the moving mechanisms 100, 106 cause the first outer die 44-1 and the second outer die 44-2 to make a stroke movement in the normal direction of the first direction X so as to approach each other. With such a stroke movement, the coil end corresponding portions on both sides of the rectangular conductor 28 are fitted between the fins 62 attached to the first outer die 44-1 and between the fins 84 attached to the second outer die 44-2, and are bent. Crank formation of substantially the middle parts in the second direction Y of the stacked conductors and arc formation are thus performed in the coil end corresponding portions on both sides of the rectangular conductor 28.

As described above, in crank formation and arc formation using the fins 62, 84, the coil end corresponding portions on both sides of the rectangular conductor 28 are pressed toward each other, namely inward in the first direction X, due to the friction with the fins located outside. If the coil end corresponding portions on both sides of the rectangular conductor 28 are pressed in this manner, the slot corresponding portions sandwiched between the coil end corresponding portions on both sides of the rectangular conductor 28 may be deformed in the second direction Y and curved outward.

On the other hand, in the above embodiment, the moving mechanisms 100, 106 cause the first outer die 44-1 and the second outer die 44-2 to make a stroke movement inward in the first direction X so as to approach each other, and substantially simultaneously, the moving mechanisms 102, 104 cause the first inner die 42-1 and the second inner die 42-2 to make a stroke movement outward in the first direction X so as to be separated from each other.

Since the outer dies 44-1, 44-2 are caused to make a stroke movement so as to approach each other and at the same time the inner dies 42-1, 42-2 are caused to make a stroke movement so as to be separated from each other, the coil end corresponding portions (in particular, substantially the middle parts in the second direction Y) and the slot corresponding portions (in particular, near the boundaries with the coil end corresponding portions) on both sides of the rectangular conductor 28 contact the processing surfaces 46, 47, 50, 51 of the inner dies 42-1, 42-2, and at the same time the coil end corresponding portions on both sides of the rectangular conductor 28 are pulled outward in the first direction X so as to be separated from each other. This configuration can therefore prevent the slot corresponding portions sandwiched between the coil end corresponding portions on both sides of the rectangular conductor 28 from being deformed in the second direction Y and curved outward during crank formation and arc formation.

The rectangular conductor 28 having a quadrilateral section is not curved in the stacking direction of the conductors before arc formation is started. Accordingly, the stacked conductors in the slot corresponding portions on both sides of the rectangular conductor 28 are kept horizontal with respect to the second direction Y. However, after arc formation is started, the rectangular conductor 28 is curved in the stacking direction of the conductors. The stacked conductors in the slot corresponding portions on both sides of the rectangular conductor 28 are thus tilted with respect to the second direction Y. That is, by arc formation of the rectangular conductor 28 having a quadrilateral section, the rectangular conductor 28 is deformed from the state where the stacked conductors of the slot corresponding portions on both sides of the rectangular conductor 28 are kept horizontal with respect to the second direction Y to the state where the stacked conductors of the slot corresponding portions on both sides of the rectangular conductor 28 are slightly shifted in the third direction Z (upward in the figure) and tilted with respect to the second direction Y.

However, the following problem occurs if the inner dies 42-1, 42-2 continue to make a stroke movement outward so as to be separated from each other, namely so as to approach their mating outer dies 44-1, 44-2, throughout the process of the arc formation of the rectangular conductor 28. Specifically, the above deformation due to the arc formation of the rectangular conductor 28 proceeds with the coil end corresponding portions and the slot corresponding portions on both sides of the rectangular conductor 28 being pulled outward in the first direction X while being in contact with the processing surfaces 46, 47, 50, 51 of the inner dies 42-1, 42-2. Accordingly, during the deformation, the inner periphery of the rectangular conductor 28 may rub against the corners (e.g., the corners of the fin-shaped portions 83, 97) formed near the processing surfaces 46, 47, 50, 51 of the inner dies 42-1, 42-2 (in particular, near each boundary between the coil end corresponding portion and the slot corresponding portion of the rectangular conductor 28) due to relative movement of the rectangular conductor 28 in the third direction Z. This may cause scratching or delamination of coating of the rectangular conductor 28.

Figure 12:
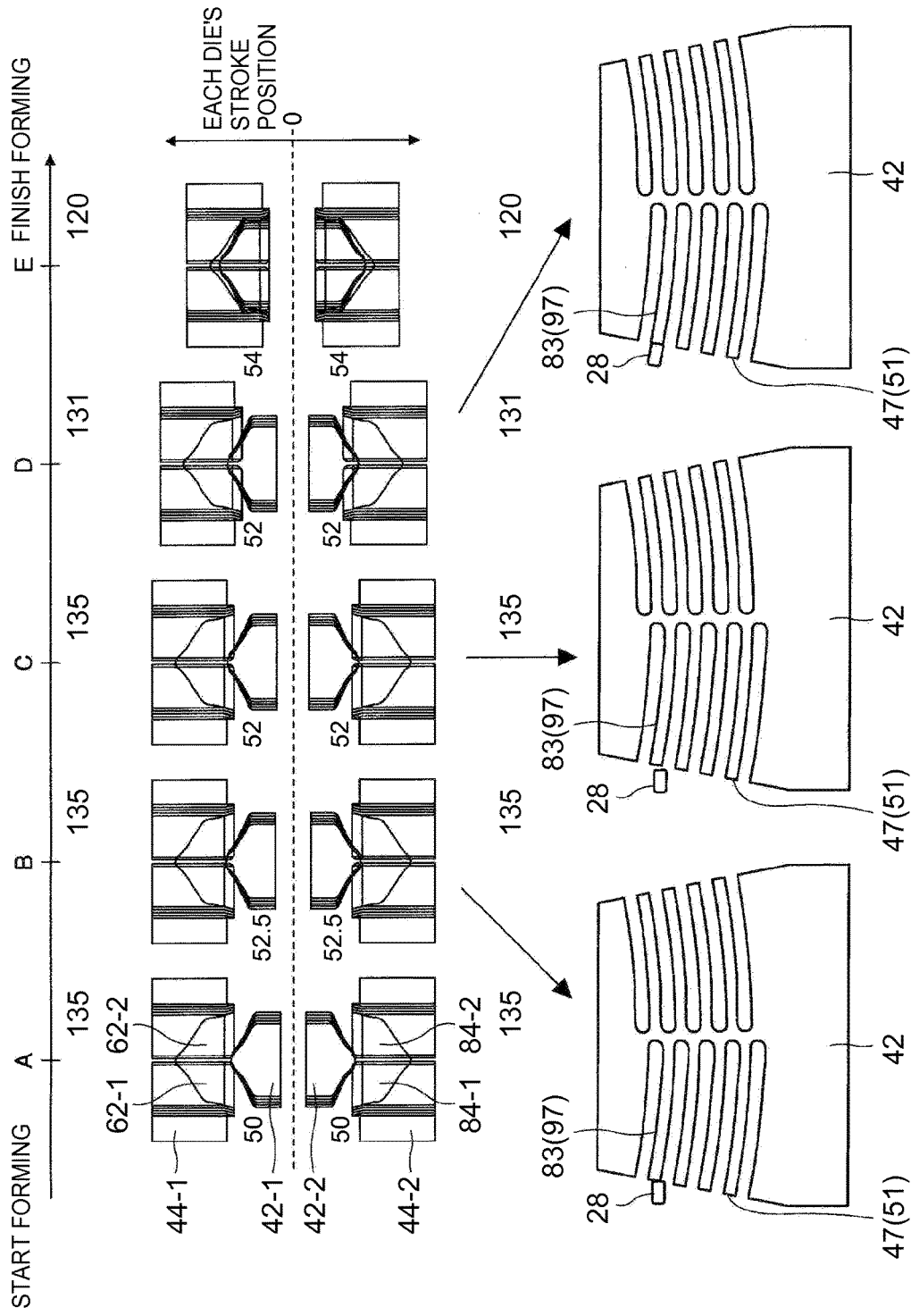
FIG. 12 is a diagram showing formation procedures to be performed by an apparatus for forming a concentric winding coil according to a modification of the present disclosure.

FIG. 12 is a diagram showing formation procedures to be performed by using the apparatus 40 for forming the concentric winding coil 14 according to a modification of the present disclosure. FIG. 12 shows the stroke positions of the dies 42-1, 42-2, 44-1, 44-2 and the positional relation between the inner die 42 and the rectangular conductor 28 at each point from the start to the end of formation using the forming apparatus 40 (specifically, points A, B, C, D, and E)

in the case where the center in the first direction X of the rectangular conductor 28 or the center in the first direction X between the first and second inner dies 42-1, 42-2 is set to zero. In FIG. 12, "50," "52," "52.5," "54," "131," and "135" shown without leader lines represent the stroke positions of the dies 42-1, 42-2, 44-1, 44-2.

In the forming apparatus 40 of this modification, at an intermediate timing (point C in FIG. 12) between the timing when such a stroke movement of the inner dies 42-1, 42-2 that the inner dies 42-1, 42-2 are separated from each other, namely the inner dies 42-1, 42-2 approach their mating outer dies 44-1, 44-2, is started and arc formation of the rectangular conductor 28 is started and the timing when the arc formation of the rectangular conductor 28 is completed, the inner dies 42-1, 42-2 are caused to make a stroke movement in the direction opposite to the normal direction (rearward movement) so as to approach each other, namely so as to be separated from their mating outer dies 44-1, 44-2. Even when the inner dies 42-1, 42-2 are caused to make a stroke movement in the direction opposite to the normal direction as described above, the outer dies 44-1, 44-2 are continuously caused to make a stroke movement in the first direction X as usual so as to approach each other.

The amount of stroke movement in the opposite direction need only be such an amount that at least the inner dies 42-1, 42-2 are separated from the rectangular conductor 28. The intermediate timing at which the stroke movement in the opposite direction is started may be any timing at which the rectangular conductor 28 is deformed from the state where the stacked conductors of the slot corresponding portions on both sides of the rectangular conductor 28 are kept horizontal with respect to the second direction Y to the state where the stacked conductors of the slot corresponding portions are tilted with respect to the second direction Y, after the slot corresponding portions sandwiched between the coil end corresponding portions on both sides of the rectangular conductor 28 are prevented from being deformed in the second direction Y and curved outward. More preferably, the intermediate timing is the timing at which deformation of the rectangular conductor 28 is most likely to occur.

In the case of performing arc formation in the configuration of the modification, even if the inner periphery of the rectangular conductor 28 is in contact with the corners near the processing surfaces 46, 47, 50, 51 of the inner dies 42-1, 42-2 immediately before the rectangular conductor 28 is deformed from the state where the stacked conductors in the slot corresponding portions on both sides of the rectangular conductor 28 are kept horizontal with respect to the second direction Y to the state where the stacked conductors in the slot corresponding portions are moved in the third direction Z and tilted with respect to the second direction Y (timing B in FIG. 12), the inner periphery of the rectangular conductor 28 can be separated from the processing surfaces 46, 47, 50, 51 of the inner dies 42-1, 42-2 when this deformation (arc deformation) is caused (timing C in FIG. 12), as shown by the sectional view at the point C in FIG. 12. The inner periphery of the rectangular conductor 28 can be prevented from contacting and rubbing against the corners near the processing surfaces 46, 47, 50, 51 of the inner dies 42-1, 42-2. The configuration of the modification can therefore prevent scratching and delamination of coating of the rectangular conductor 28 due to rubbing of the rectangular conductor 28 against the corners of the inner dies 42-1, 42-2 during arc formation of the rectangular conductor 28.

The stroke movement in the opposite direction may be made in any manner as long as it is temporary. In this case, after the stroke movement in the opposite direction is finished, the inner dies 42-1, 42-2 are caused to make a stroke movement in the normal direction again so as to be separated from each other, namely so as to approach their mating outer dies 44-1, 44-2. In arc formation, if the inner dies 42-1, 42-2 are caused to make a stroke movement in the normal direction again so as to be separated from each other, namely so as to approach their mating outer dies 44-1, 44-2, after the rectangular conductor 28 is deformed from the state where the stacked conductors in the slot corresponding portions on both sides of the rectangular conductor 28 are kept horizontal with respect to the second direction Y to the state where the stacked conductors in the slot corresponding portions are tilted with respect to the second direction Y, or after this deformation is substantially completed, the rectangular conductor 28 contacts the inner dies 42-1, 42-2. However, since almost no deformation of the rectangular conductor 28 occurs thereafter in association with the arc formation, scratching and delamination of coating of the rectangular conductor 28 can be prevented, and the subsequent edgewise formation etc. can be appropriately performed.

The following will be described with respect to the above embodiment.

(1) A method for forming a concentric winding coil 14 in which a coil end portion 34, 36 protruding from an axial end face of a stator core 12 has a plurality of different nonlinear shapes, from a rectangular conductor 28 wound in a predetermined number of turns includes: forming the coil end portion 34, 36 into the plurality of different nonlinear shapes in one step by causing a die 42, 44 to make a stroke movement in a predetermined direction with respect to the rectangular conductor 28 being set; bending a corresponding portion of the rectangular conductor 28 which corresponds to the coil end portion 34, 36 in a stacking direction in which windings of the rectangular conductor 28 to be set are stacked, by inserting the corresponding portion into a predetermined clearance by using a fin-shaped die 44 having a plurality of fins 62, 84 that are arranged next to each other in the stacking direction with the predetermined clearance therebetween, and bending the corresponding portion in a perpendicular direction perpendicular to the stacking direction of the rectangular conductor 28 to be set, by using an outer shape forming die 42 formed integrally with the fin-shaped die 44 and having a processing surface 46, 50, 54, 58 facing in the perpendicular direction; and causing the bending of the corresponding portion of the rectangular conductor 28 to proceed from a middle part of the corresponding portion toward both outer ends thereof.

In the configuration of (1), the coil end portion can be formed into the plurality of different linear shapes by the one step of causing the die to make a stroke movement in the predetermined direction with respect to the rectangular conductor being set. In such a configuration, separate dies or jigs are not required to form the individual nonlinear shapes. The concentric winding coil can therefore be formed easily. The coil end portion can be substantially simultaneously formed into the plurality of different nonlinear shapes, and stacked conductors in the stacking direction need not be bent one by one in order to form the substantially hexagonal concentric winding coil 14 from the substantially elliptical rectangular conductor wound in the plurality of turns. The concentric winding coil can therefore be formed in a short time. Moreover, the bending of the coil end corresponding portion of the rectangular conductor can be caused to proceed from the middle part in the second direction Y toward both outer ends when forming the rectangular conductor into the concentric winding coil. This configuration can prevent the unwanted conductors from gathering substantially in the middle part in the second direction Y of the coil end corresponding portion of the rectangular conductor. Formation accuracy of the concentric winding coil can thus be improved.

(2) In the method for forming the concentric winding coil 14 according to (1), the bending in the perpendicular direction is performed after the bending in the stacking direction is performed.

In the configuration of (2), the bending of the corresponding portion of the rectangular conductor which corresponds to the coil end portion in the perpendicular direction is performed after the bending in the stacking direction, and is performed with each of the stacked conductors of the rectangular conductor in the stacking direction being sandwiched between the fins. Accordingly, deformation of the coil end corresponding portion of the rectangular conductor which has been bent in the stacking direction can be suppressed during the bending in the perpendicular direction. The concentric winding coil can thus be formed accurately.

(3) In the method for forming the concentric winding coil 14 according to (1) or (2), the plurality of different nonlinear shapes in the coil end portion 34, 36 includes a crank shape located in a middle part of the coil end portion 34, 36, and an arc shape placed on both sides of the middle part and corresponding to an arc of the stator core 12 having an annular shape, and the bending in the stacking direction is crank formation for forming the crank shape and arc formation for forming the arc shape.

(4) In the method for forming the concentric winding coil 14 according to (3), two of the coil end portions 34, 36 located on both sides in an axial direction of the stator core 12 are formed at least into the crank shape and the arc shape, and the formation of the two coil end portions 34, 36 proceeds simultaneously.

In the configuration of (4), both of the coil end portions of the concentric winding coil can be substantially simultaneously formed into the plurality of different nonlinear shapes. The concentric winding coil can therefore be formed in a short time. This configuration can also suppress deformation that is caused by separately forming the coil end portions.

(5) An apparatus 40 for forming a concentric winding coil 14 in which a coil end portion 34, 36 protruding from an axial end face of a stator core 12 has a plurality of different nonlinear shapes, from a rectangular conductor 28 wound in a predetermined number of turns, includes: a fin-shaped die 44 that has a plurality of fins 62, 84 arranged next to each other with a predetermined clearance therebetween in a stacking direction in which windings of the rectangular conductor 28 to be set are stacked, and that bends a corresponding portion of the rectangular conductor 28 which corresponds to the coil end portion 34, 36 in the stacking direction by inserting the corresponding portion into the clearance; an outer shape forming die 42, 44 that is formed integrally with the fin-shaped die 44, that has a processing surface 46, 50, 54, 58 facing in a perpendicular direction perpendicular to the stacking direction of the rectangular conductor 28 to be set, and that bends the corresponding portion of the rectangular conductor 28 in the perpendicular direction; and a moving mechanism 100, 102, 104, 106 that causes the fin-shaped die 44 and the outer shape forming die 42, 44 to make a stroke movement in a predetermined direction with respect to the rectangular conductor 28 being set, wherein the bending of the corresponding portion of the rectangular conductor 28 is caused to proceed from a middle part of the corresponding portion toward both outer ends thereof.

In the configuration of (5), the coil end portion can be formed into the plurality of different linear shapes by the one step of causing the die to make a stroke movement in the predetermined direction with respect to the rectangular conductor being set. In such a configuration, separate dies or jigs are not required to form the individual nonlinear shapes. The concentric winding coil can therefore be formed easily. The coil end portion can be substantially simultaneously formed into the plurality of different nonlinear shapes, and stacked conductors in the stacking direction need not be bent one by one in order to form the substantially hexagonal concentric winding coil 14 from the substantially elliptical rectangular conductor wound in the plurality of turns. The concentric winding coil can therefore be formed in a short time. Moreover, the bending of the coil end corresponding portion of the rectangular conductor can be caused to proceed from the middle part in the second direction Y toward both outer ends when forming the rectangular conductor into the concentric winding coil. This configuration can prevent the unwanted conductors from gathering substantially in the middle part in the second direction Y of the coil end corresponding portion of the rectangular conductor. Formation accuracy of the concentric winding coil can thus be improved.

(6) In the apparatus 40 for forming the concentric winding coil 14 according to (5), the outer shape forming die 42, 44 bends the corresponding portion of the rectangular conductor 28 in the perpendicular direction after the fin-shaped die 44 bends the corresponding portion of the rectangular conductor 28 in the stacking direction.

In the configuration of (6), the bending of the corresponding portion of the rectangular conductor which corresponds to the coil end portion in the perpendicular direction is performed after the bending in the stacking direction, and is performed with each of the stacked conductors of the rectangular conductor in the stacking direction being sandwiched between the fins. Accordingly, deformation of the coil end corresponding portion of the rectangular conductor which has been bent in the stacking direction can be suppressed during the bending in the perpendicular direction. The concentric winding coil can thus be formed accurately.

(7) In the apparatus 40 for forming the concentric winding coil 14 according to (5) or (6), the fin-shaped die 44 forms the middle part of the corresponding portion of the rectangular conductor 28 into a crank shape, and forms both sides of the middle part of the corresponding portion of the rectangular conductor 28 into an arc shape corresponding to an arc of the stator core 12 having an annular shape.

(8) In the apparatus 40 for forming the concentric winding coil 14 according to (7), the fin-shaped die 44 forms two of the coil end portions 34, 36 located on both sides in an axial direction of the stator core 12 at least into the crank shape and the arc shape, and causes the formation of the two coil end portions 34, 36 to proceed simultaneously.

In the configuration of (8), both of the coil end portions of the concentric winding coil can be substantially simultaneously formed into the plurality of different nonlinear shapes. The concentric winding coil can therefore be formed in a short time. This configuration can also suppress deformation that is caused by separately forming the coil end portions.

(9) In the apparatus 40 for forming the concentric winding coil 14 according to any one of (5) to (8), the number of fins 62, 84 arranged next to each other in the stacking direction is larger than that of stacked conductors in a portion of the rectangular conductor 28 which is to be bent in the stacking direction by using the fins 62 by "1."

(10) In the apparatus 40 for forming the concentric winding coil 14 according to any one of (5) to (9), the plurality of fins 62, 84 are arranged concentrically with each other so that the clearance between the fins is formed in a transferred shape of a plurality of conductors that are stacked in the stacking direction of the concentric winding coil 14.

(11) In the apparatus 40 for forming the concentric winding coil 14 according to any one of (5) to (10), the fin-shaped die 44 bends the corresponding portion of the rectangular conductor 28 in the stacking direction by using a taper surface of a tapered tip end of the fin 62, 84.

(12) In the apparatus 40 for forming the concentric winding coil 14 according to any one of (5) to (11), the outer shape forming die 42, 44 performs edgewise formation of the corresponding portion of the rectangular conductor 28 in the perpendicular direction.

(13) In the apparatus 40 for forming the concentric winding coil 14 according to any one of (5) to (12), the outer shape forming die 42, 44 is first and second recessed dies 44-1, 44-2 that are placed outside the windings of the rectangular conductor 28 and that are formed so as to correspond to a shape of the coil end portion 34, 36 of the concentric winding coil 14, and first and second protruding dies 42-1, 42-2 that are placed inside the windings of the rectangular conductor 28, that are paired with the first and second recessed dies 44-1, 44-2, and that are formed so as to correspond to the shape of the coil end portion 34, 36 of the concentric winding coil 14, and the fin-shaped die 44 is a die having the plurality of fins 62, 84 fixedly fitted in the first recessed die 44-1 and the second recessed die 44-2.

(14) In the apparatus 40 for forming the concentric winding coil 14 according to (13), the moving mechanism 100, 102, 104, 106 causes the first recessed die 44-1 and the first protruding die 42-1, which form a pair and which are formed so as to correspond to the shape of the coil end portion 34 on one side of the concentric winding coil 14, to make a stroke movement in opposite directions from each other so as to sandwich therebetween the corresponding portion on one side of the rectangular conductor 28 being set, and causes the second recessed die 44-2 and the second protruding die 42-2, which form a pair and which are formed so as to correspond to the shape of the coil end portion 36 on the other side of the concentric winding coil 14, to make a stroke movement in opposite directions from each other so as to sandwich therebetween the corresponding portion on the other side of the rectangular conductor 28 being set.

(15) In the apparatus 40 for forming the concentric winding coil 14 according to (14), at an intermediate timing between a timing when the bending of the corresponding portion of the rectangular conductor 28 in the stacking direction is started by starting the stroke movement of the first recessed die 44-1 and the first protruding die 42-1 and the stroke movement of the second recessed die 44-2 and the second protruding die 42-2 by the moving mechanism 100, 102, 104, 106, and a timing when the bending is completed, the moving mechanism 100, 102, 104, 106 causes only the first protruding die 42-1 and the second protruding die 42-2 to make a stroke movement each in an opposite direction to that at the time the stroke movement was started so that the first protruding die 42-1 and the second protruding die 42-2 are separated from the rectangular conductor 28.

In the configuration of (15), when bending the rectangular conductor in the stacking direction, the inner periphery of the rectangular conductor can be prevented from contacting and rubbing against corners of the first protruding die and the second protruding die. This can prevent scratching and delamination of coating of the rectangular conductor.

(16) In the apparatus 40 for forming the concentric winding coil 14 according to any one of (5) to (15), the moving mechanism 100, 102, 104, 106 causes the fin-shaped die 44 and the outer shape forming die 42, 44 to make a stroke movement in a direction connecting the corresponding portions on both sides of the rectangular conductor 28 being set.

This international application claims priority to Japanese Patent Application No. 2013-074557 filed on Mar. 29, 2013 and Japanese Patent Application No. 2013-187743 filed on, Sep. 10, 2013, the entire disclosure of which is incorporated by reference herein.

The invention claimed is:

1. A method for forming a concentric winding coil in which a coil end portion protruding from an axial end face of a stator core has a plurality of different nonlinear shapes, from a rectangular conductor wound in a predetermined number of turns, the method comprising:
    forming the coil end portion into the plurality of different nonlinear shapes in one step by causing a die to make a stroke movement in a predetermined direction with respect to the rectangular conductor being set;
    bending a corresponding portion of the rectangular conductor which corresponds to the coil end portion in a stacking direction in which windings of the rectangular conductor to be set are stacked, by inserting the corresponding portion into a predetermined clearance by using a fin-shaped die having a plurality of fins that are arranged next to each other in the stacking direction with the predetermined clearance therebetween, and bending the corresponding portion in a perpendicular direction perpendicular to the stacking direction of the rectangular conductor to be set, by using an outer shape forming die formed integrally with the fin-shaped die and having a processing surface facing in the perpendicular direction; and
    causing the bending of the corresponding portion of the rectangular conductor to proceed from a middle part of the corresponding portion toward both outer ends thereof.

2. The method for forming a concentric winding coil according to claim 1, wherein
    the bending in the perpendicular direction is performed after the bending in the stacking direction is performed.

3. The method for forming a concentric winding coil according to claim 2, wherein
    the plurality of different nonlinear shapes in the coil end portion includes a crank shape located in a middle part of the coil end portion, and an arc shape placed on both sides of the middle part and corresponding to an arc of the stator core having an annular shape, and
    the bending in the stacking direction is crank formation for forming the crank shape and arc formation for forming the arc shape.

4. The method for forming a concentric winding coil according to claim 3, wherein
    two of the coil end portions located on both sides in an axial direction of the stator core are formed at least into the crank shape and the arc shape, and
    the formation of the two coil end portions proceeds simultaneously.

* * * * *